United States Patent
Nakamura

(10) Patent No.: US 8,681,379 B2
(45) Date of Patent: Mar. 25, 2014

(54) IMAGE PROCESSING APPARATUS, SYSTEM, AND METHOD

(75) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 13/558,563

(22) Filed: Jul. 26, 2012

(65) Prior Publication Data

US 2013/0027759 A1     Jan. 31, 2013

(30) Foreign Application Priority Data

Jul. 28, 2011    (JP) ................................. 2011-165810

(51) Int. Cl.
| | |
|---|---|
| G06F 15/00 | (2006.01) |
| H04N 1/46 | (2006.01) |
| G06K 15/00 | (2006.01) |
| G03F 3/08 | (2006.01) |
| H04N 1/04 | (2006.01) |
| G06F 3/12 | (2006.01) |
| H04N 1/00 | (2006.01) |
| G06K 9/00 | (2006.01) |
| G06K 9/40 | (2006.01) |

(52) U.S. Cl.
USPC ........... 358/1.9; 358/505; 358/518; 358/3.13; 358/486; 358/1.15; 358/406; 382/167; 382/254

(58) Field of Classification Search
USPC ........ 358/1.9, 505, 518, 3.13, 486, 1.15, 406; 382/167, 254
See application file for complete search history.

(56) References Cited

U.S. PATENT DOCUMENTS

| | | | |
|---|---|---|---|
| 7,355,748 B2 * | 4/2008 | Arai et al. ...................... 358/1.9 |
| 7,826,089 B2 | 11/2010 | Inoue | |
| 7,978,366 B2 | 7/2011 | Ming | |
| 2002/0141639 A1 | 10/2002 | Steinberg | |
| 2002/0149799 A1 * | 10/2002 | Hayashi ........................ 358/406 |
| 2002/0159083 A1 * | 10/2002 | Arai et al. ...................... 358/1.9 |
| 2003/0034983 A1 | 2/2003 | Muramoto | |
| 2005/0152612 A1 * | 7/2005 | Spaulding et al. ............ 382/254 |
| 2007/0242291 A1 * | 10/2007 | Harigai .......................... 358/1.9 |
| 2012/0162719 A1 * | 6/2012 | Klaus ........................... 358/3.13 |

FOREIGN PATENT DOCUMENTS

| | | |
|---|---|---|
| JP | H06-291996 | 10/1994 |
| JP | 2001-119592 | 4/2001 |
| JP | 2004-304773 | 10/2004 |
| JP | 2009-177790 | 8/2009 |
| WO | WO 93/20648 A1 | 10/1993 |

OTHER PUBLICATIONS

Extended European search report dated Jan. 8, 2014.

* cited by examiner

*Primary Examiner* — Charlotte M Baker
*Assistant Examiner* — Rury Grisham
(74) *Attorney, Agent, or Firm* — IPUSA, PLLC

(57) ABSTRACT

A image processing apparatus includes a transformation unit that reproduces a color tone of a first output data of an original image data output from a first image output apparatus by using a second output data of the original image data output from a second image output apparatus, an estimating unit that estimates first and second geometric transformation parameters, an associating unit that generates first and second color component value association data, and a determining unit that generates a color tone transformation parameter based on a combination of pixel values in which a pixel value of the first image output data is substantially equivalent to a pixel value of the second image output data.

11 Claims, 19 Drawing Sheets

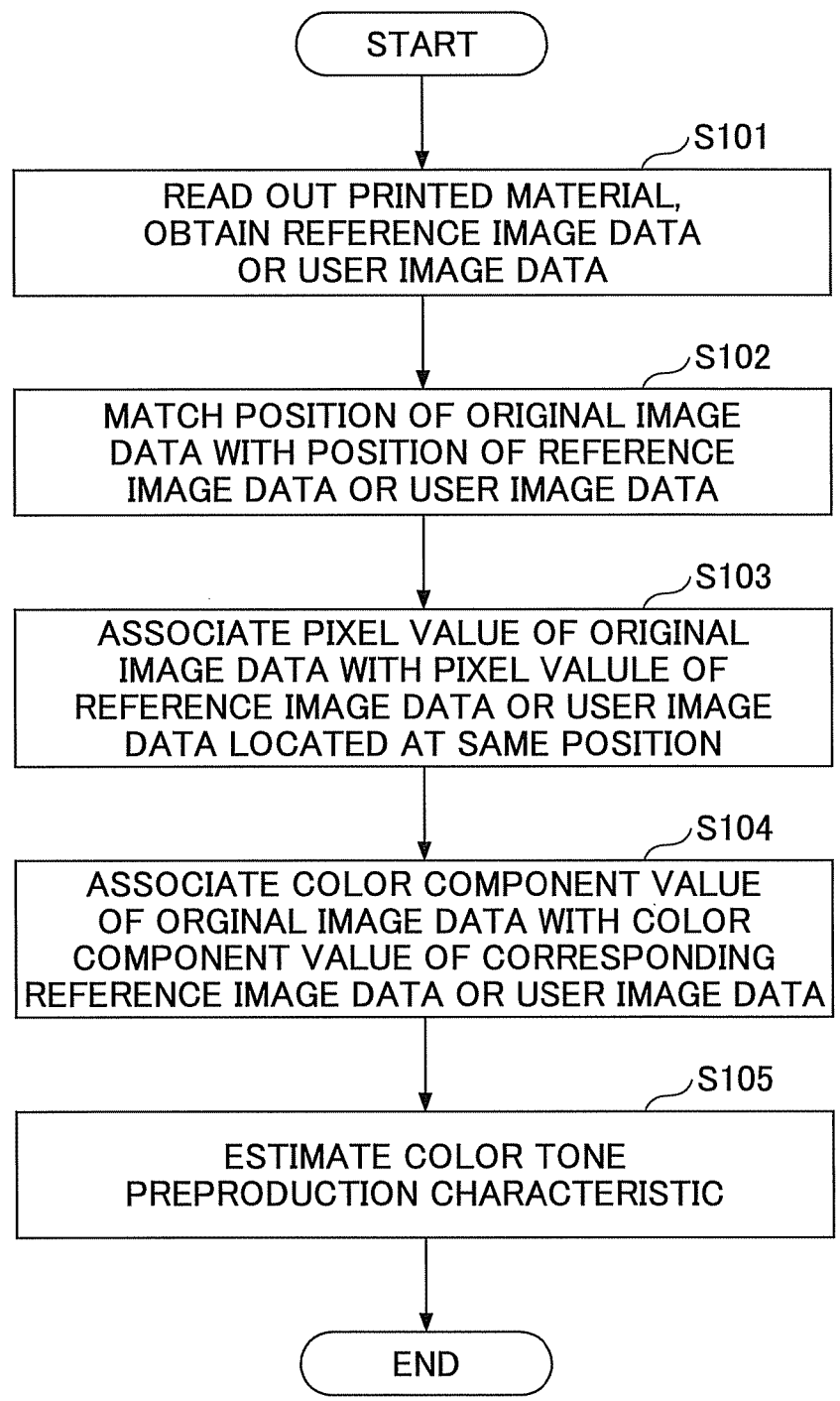

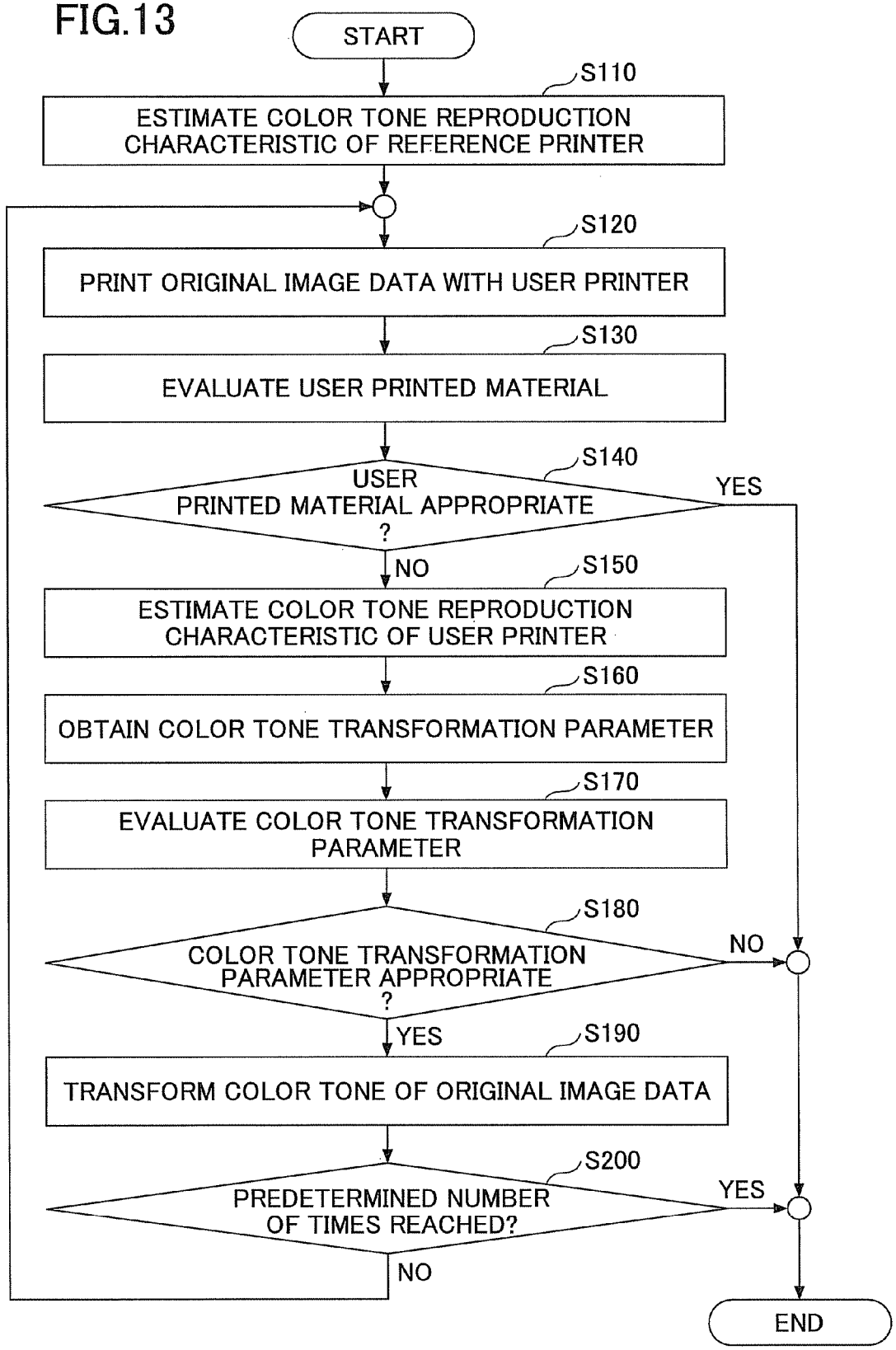

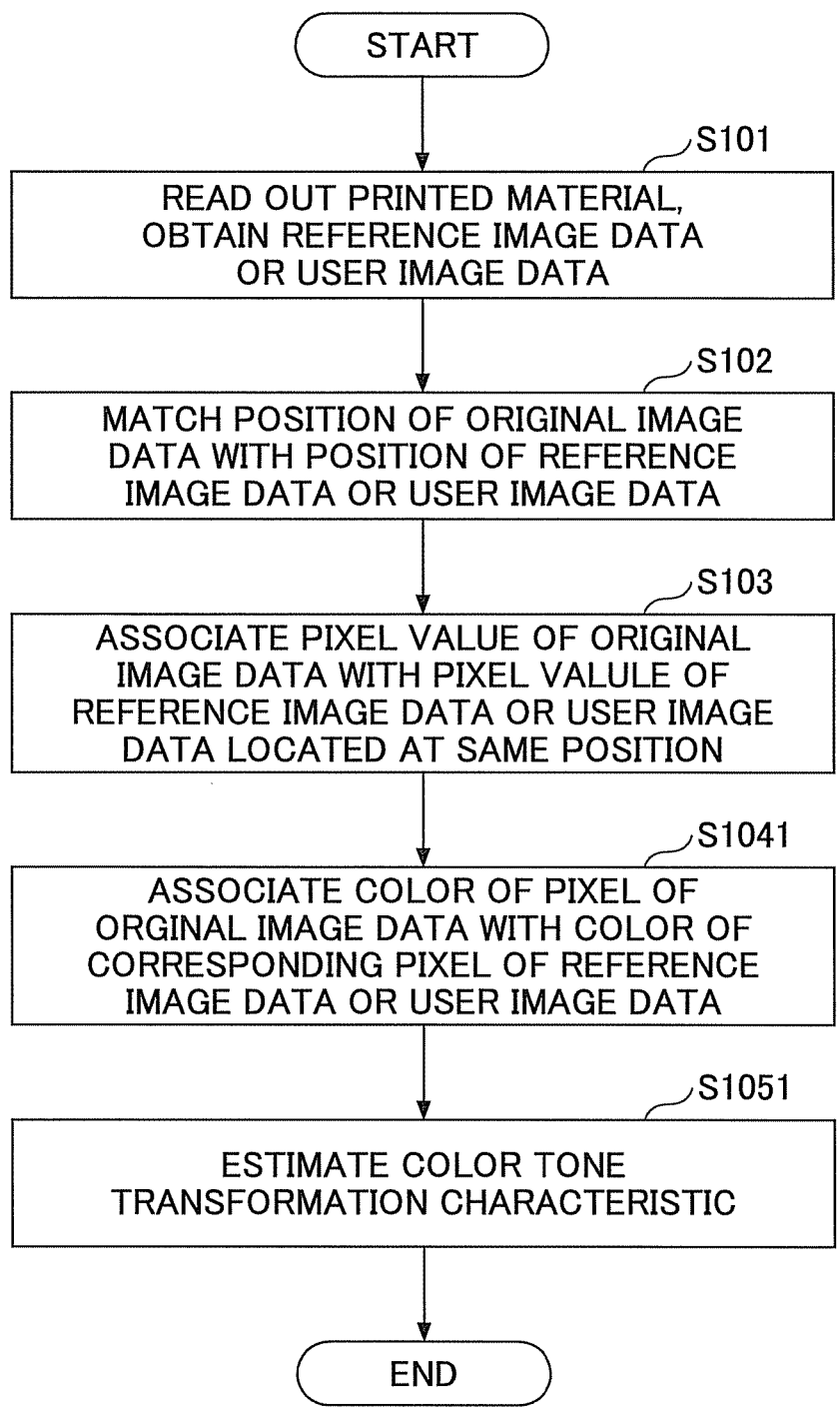

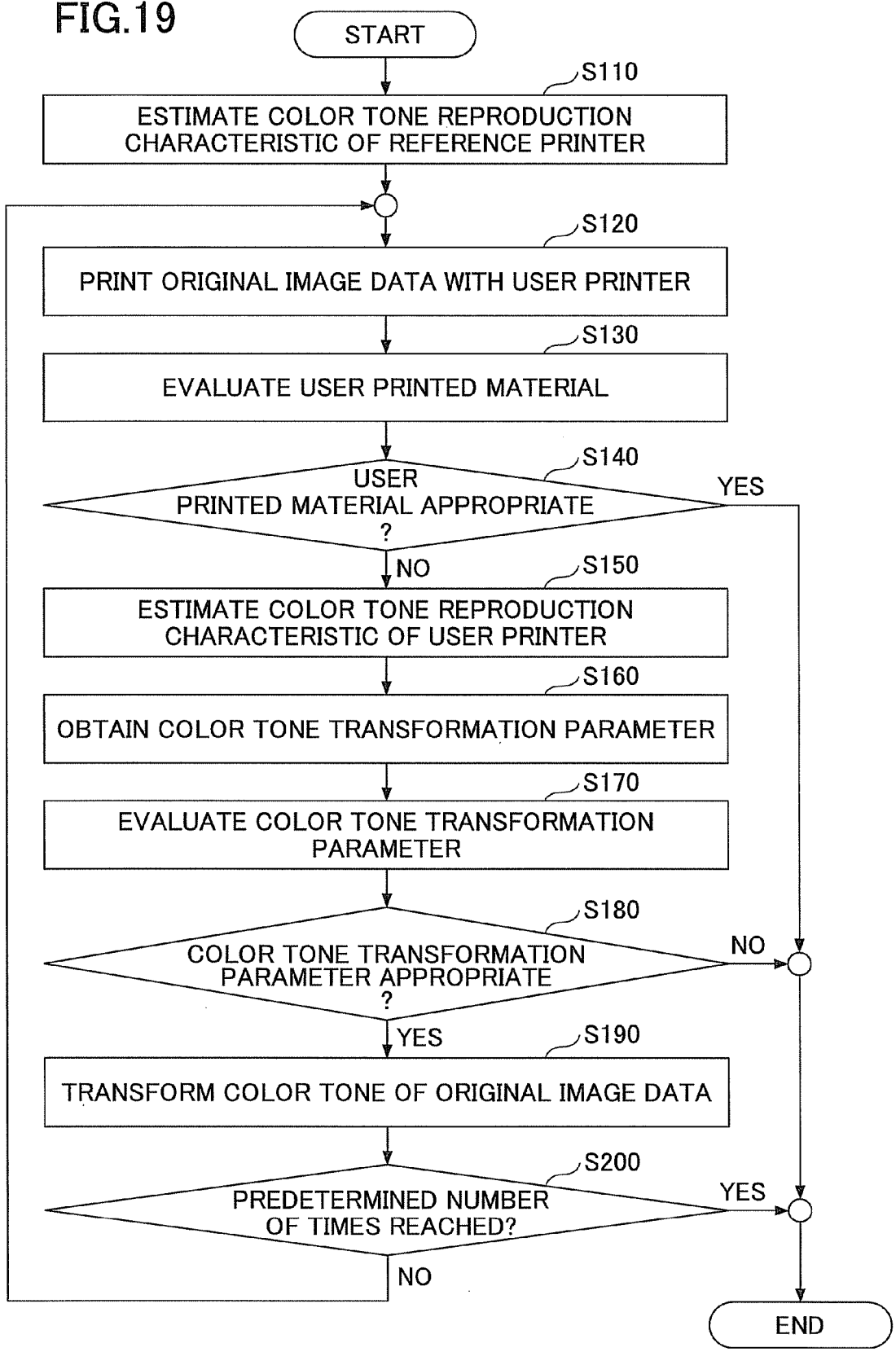

IMAGE PROCESSING APPARATUS, SYSTEM, AND METHOD

BACKGROUND OF THE INVENTION

1. Field of the Invention

The present invention relates to an image processing apparatus, system, and method.

2. Description of the Related Art

Image output apparatuses (e.g., printing machines, displays) output images according to pixel values of an original. Accordingly, in some cases, the image output apparatus performs an operation of updating a color profile of the image output apparatus based on comparison between, for example, a pixel value of an original and a pixel value of a printed material measured by a colorimeter. In a case of updating the color profile of the image output apparatus, there is a known updating method in which the image output apparatus outputs a color chart whose pixel values are known, and a colorimeter (e.g., scanner) is used to measure the pixel values of the colors of the color chart. Based on the results of comparing the pixel values of the color chart and the measured pixel values, the color profile of the image output apparatus is updated. Such method is disclosed in, for example, Japanese Laid-Open Patent Publication No. 2009-177790.

There are basically 2 types of updating methods. The 2 types are described with an example of a printing machine.

a) Matching Color Tone with a Reference Color Chart

In this method, first, a reference color chart (color chart defined as a reference) is printed by an image output apparatus. Then, each color patch constituting the reference color chart is measured with a colorimeter. Then, a printer profile of the image output apparatus is updated so that the difference between a value measured by the colorimeter and a desired value is within a predetermined range.

b) Matching Color Tone with a Reference Image Output Apparatus

In this method, first, a color tone of an output of a proofer (calibrator for calibrating color tone or a printing machine capable of outputting substantially the same output material as the calibrator) is matched with a color tone of the output of an image output apparatus. In this case, a color chart of the proofer and a color chart of the image output apparatus are printed, respectively. Then, the values of each color patch of the two printed color charts are measured with a colorimeter. Then, a printer profile of the proofer is updated so that the difference between the measured values between the two printed color charts is within a predetermined range.

However, the above-described method for updating color profile has a problem of being unable to be performed in a situation where a printed material of the reference color chart cannot be obtained. This is because matching the color tone output from one image output apparatus with a color tone of another image output apparatus requires the same color chart to be output by both image output apparatuses. However, in reality, there may be a case where a reference image output apparatus is unable to output a color chart or a case where an image output apparatus, which performs updating a color profile, is unable to obtain a reference color chart printed by the reference image output apparatus.

One example of such situation is a case of receiving an order for a printing service from a customer where the customer requests color tone to be matched with the output results of the customer's printer. It may be possible for the supplier of the printing service (printing service supplier) to fulfill such request if the customer appropriately conducts color management. However, the customer is often not adept with color management. Appropriate conducting of color management may be, for example, a case where calibration of the image output apparatus is periodically conducted or a case where colors of image data are managed based on a standardized system (e.g., ICC (International Color Consortium).

The printing service supplier needs to perform the matching process manually in a case where the color chart cannot be used or a case where the customer does not appropriately conduct color management. The manual matching process requires a long amount of time and depends heavily on the experience and instinct of the printing service supplier. Further, the manual matching process leads to losses including spoiled paper (hereinafter also referred to as "waste paper") because it is necessary to confirm the matching results by consecutively output printed material.

SUMMARY OF THE INVENTION

The present invention may provide an image processing apparatus, system, and method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image processing apparatus, system, and method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides A image processing apparatus including: a transformation unit configured to reproduce a color tone of a first output data of an original image data output from a first image output apparatus by using a second output data of the original image data output from a second image output apparatus; an estimating unit configured to estimate first and second geometric transformation parameters; an associating unit configured to generate first and second color component value association data; and a determining unit configured to generate a color tone transformation parameter based on a combination of pixel values in which a pixel value of the first image output data is substantially equivalent to a pixel value of the second image output data; wherein the transformation unit is configured to transform pixel values of the original image data with the color tone transformation parameter generated by the determining unit; wherein the associating unit is configured to detect at least a first pixel located in corresponding positions of the original image data and the first output data based on the first geometric transformation parameter and at least a second pixel located in corresponding positions of the original image data and the second output data based on the second geometric transformation parameter; wherein the associating unit is configured to generate the first and second color component value association data based on the detected first and the second pixels.

Other objects, features and advantages of the present invention will become more apparent from the following detailed description when read in conjunction with the accompanying drawings.

BRIEF DESCRIPTION OF THE DRAWINGS

FIG. 9 is a flowchart illustrating steps including, for example, reading reference printed material and user printed material with an image reading unit and generating color tone reproduction characteristic data with a color tone reproduction characteristic estimating unit according to an embodiment of the present invention;

FIG. 13 is a flowchart illustrating an example of an operation of generating color tone transformation parameter by a color transformation parameter generation system or a MFP according to the first embodiment of the present invention;

FIG. 18 is a flowchart illustrating an example of an operation of reading a reference printed material and a user printed material with an image reading unit and generating color tone reproduction characteristic data with, for example, a color tone reproduction characteristic estimating unit according to an embodiment of the present invention; and FIG. 19 is a flowchart illustrating an example of an operation of generating a color tone transformation parameter by a color transformation parameter generation system or a MFP according to the fourth embodiment of the present invention.

DETAILED DESCRIPTION OF THE PREFERRED EMBODIMENTS

First Embodiment

In the following embodiments of the present invention, the color tone reproduction characteristic of a first image output apparatus is defined as "$P_1(x)$", the color tone reproduction characteristic of a second image output apparatus is defined as "$P_2(x)$", and the color tone reproduction characteristic of an image reading apparatus is defined as "$S(x)$", respectively, wherein "x" represents a color or a pixel value. Technically, "pixel value" is not equivalent to "color" in view of the existence of various kinds of color spaces. In the following, however, "pixel value" and "color" are not strictly distinguished from each other because "pixel value=color" in the same color space. Further, a first color tone reproduction characteristic can be expressed as "$S(P_1(x))$", and a second color tone reproduction characteristic can be expressed as "$S(Px(x))$".

It is to be noted that "$P_1(x)$" represents a color corresponding to a case where a pixel value x is printed by the first image output apparatus, and "$S(P_1(x))$" represents a gradation corresponding to a case where the color "$P_1(x)$" is read by the image output apparatus. Further, "$P_2(x)$" represents a color corresponding to a case where a pixel value x is printed by the second image output apparatus, and "$S(P_2(x))$" represents a gradation corresponding to a case, where the color "$P_2(x)$" is read by the image output apparatus.

In a case where the pixel value x printed by the first image output apparatus and the pixel value x printed by the second image output apparatus are the same, gradation would not be "$S(P_1(x))=S(P_2(x))$" because the color tone reproduction characteristics P (x) of the first and the second are different from each other. On the other hand, in a case where the pixel value x printed by the first image output apparatus and the pixel value x printed by the second image output apparatus are not the same, a combination of colors (a, b) satisfying a relationship of "$S(P_1(a))=S(P_2(b))$" is expected to exist in the image data of a printing object (corresponding to below-described "original image data"). It is, however, to be noted that "$S(P_1(a))$" and "$S(P_2(b))$" do not need to be exactly the same.

With the image process apparatus according to an embodiment of the present invention, one or more combinations (a, b) satisfying are "$S(P_1(a))=S(P_2(b))$" are obtained. In other words, because $S(P_2(b))$ can be obtained by printing a pixel value "b" with the second image output apparatus, a transformation where a pixel value "a" is assumed as the pixel value "b" is performed. Thereby, in a case of printing the pixel value "a" with the second image output apparatus, the pixel value "b" is printed in reality. Accordingly, the second image output apparatus can perform printing with the same color tone as that of the first image output apparatus.

Figure 1:
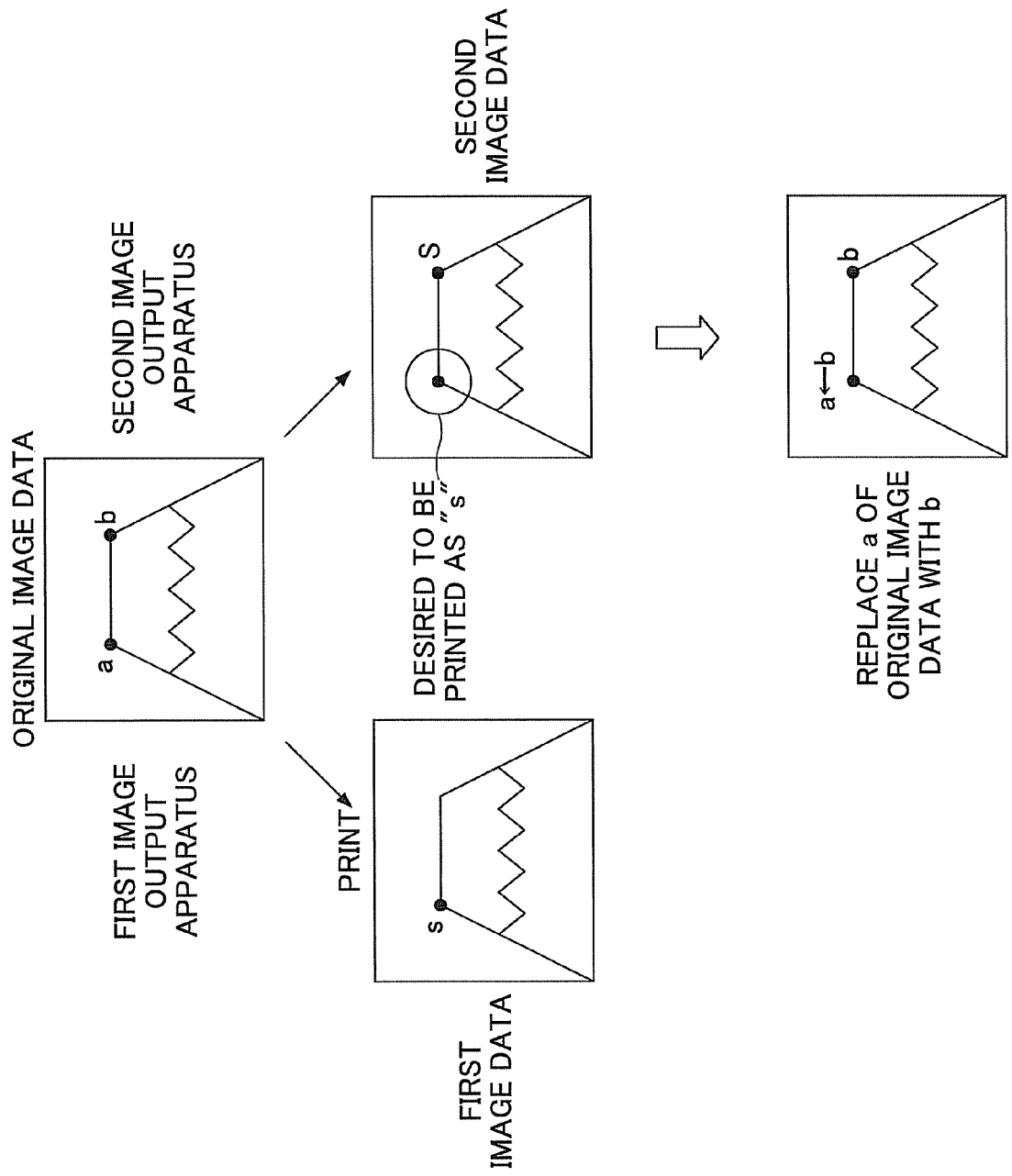
FIG. 1 is a schematic diagram for describing a relationship between pixel value "a" and pixel value "b" according to an embodiment of the present invention.

FIG. 1 is a schematic diagram for describing a relationship between the pixel value "a" and the pixel value "b" according to an embodiment of the present invention. In this example, both the first and second image output apparatuses print the same image data. The image data is referred to as "original image data".

In a case of printing the pixel value "a" with the first image output apparatus, the first image output apparatus prints a first output object which becomes a gradation "s" when the image data is scanned. In a case of printing the pixel value "b" with the second image output apparatus, the second image output apparatus prints a second output object which becomes a gradation "S" when the image data is scanned. Thus, it can be understood that the second image output apparatus is to perform printing so that the pixel value "a" becomes "s" (becomes "s" when read out) in a case of matching the color tone reproduction characteristic of the second image output device with that of the first image output apparatus. Accordingly, the second image output apparatus replaces the pixel value "a" with the pixel value "b" of the original image data. By performing this color transformation (color replacement), the second image output apparatus can perform printing with the same color tone as that of the first image output apparatus.

Color tone reproduction characteristics are explained by using schematic drawings as follows. In the below-described embodiment, the image output apparatus is a printer, and the image reading apparatus is a scanner.

Figure 2A:
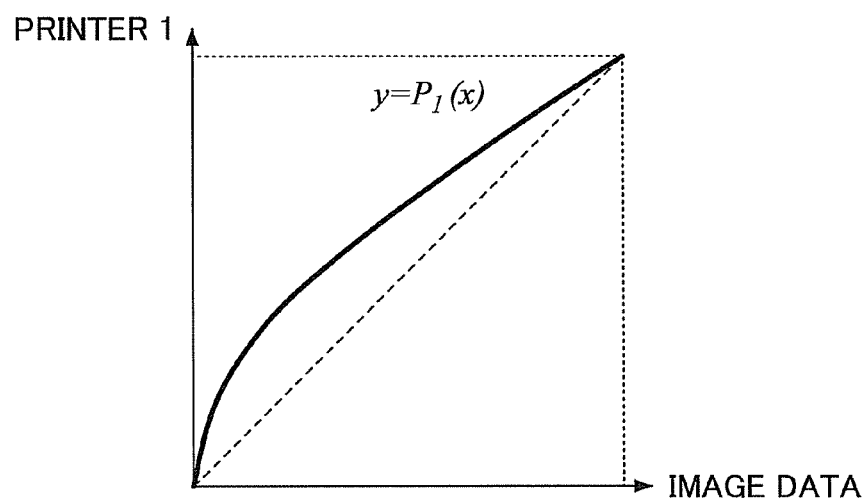
FIGS. 2A-2C are schematic diagrams for describing color tone transformation characteristics.
Figure 2B:
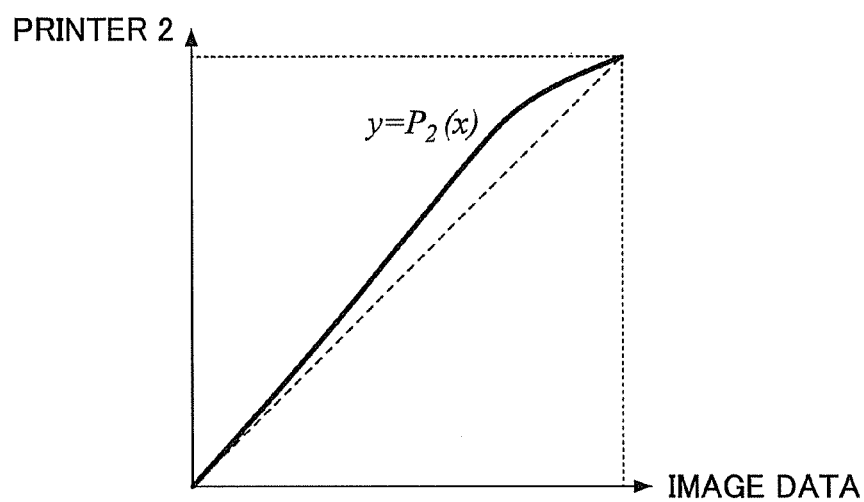

FIGS. 2A and 2B are schematic diagrams for describing color tone reproduction characteristics. The color tone reproduction characteristic of the first image output apparatus indicates the gradation to which a given color of an input original image data is allocated by the first image output apparatus. Accordingly, in a case where the horizontal axis of FIG. 2A represents a color of an image and the vertical axis of FIG. 2A represents a gradation of a printed material, the color reproduction characteristic of the first image output apparatus can be illustrated as the solid line of FIG. 2A.

It is to be noted that the broken line of FIG. 2A represents a hypothetical color tone reproduction characteristic where the color of the original image data is equivalent to the gradation of the printed material. In comparing the solid line and the broken line of FIG. 2A, more dark parts of the original image data are allocated to the gradation of the printed material compared to the light parts of the original image data.

The color tone reproduction characteristic of the second image output apparatus, which is illustrated with a solid line in FIG. 2B, is substantially the same as the color tone reproduction characteristic of the first image output apparatus. As illustrated in FIG. 2B, more dark parts of the original image data are allocated to the gradation of the printed material compared to light parts of the original image data. However, compared to the color tone reproduction property of FIG. 2A, the color tone reproduction property of FIG. 2B more light parts of the original image data area allocated to the gradation of the printed material.

Figure 2C:
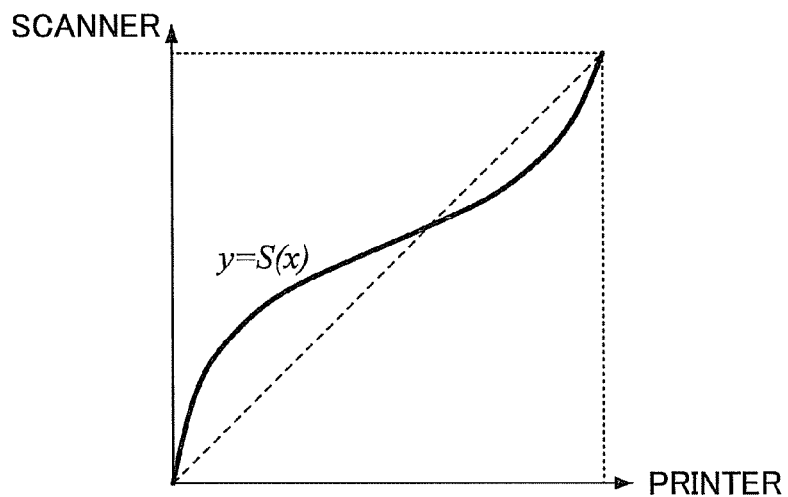

On the other hand, the color tone reproduction characteristic of the image reading apparatus indicates the color to which a given gradation of an input image data of a printed material is allocated. Accordingly, in a case where the horizontal axis of FIG. 2C represents a gradation of a printed material and the vertical axis of FIG. 2C represents a color of an image data read by the image reading apparatus, the color reproduction characteristic of the image reading apparatus can be illustrated as the solid line of FIG. 2C. As illustrated in FIG. 2C, it can be understood that more pixel values are allocated to both dark and light parts of the printed material, and the pixel values in the middle parts are reduced (compressed).

If a printer profile or a scanner profile can be obtained, color tone reproduction characteristics can be derived as described above. Even if the printer profile or the scanner profile cannot be obtained, the printer profile can be calculated by printing out a color chart of the printer and measuring the printed results with a colorimeter. Even if the scanner profile cannot be obtained, the scanner profile can be calculated by reading a color chart and comparing the read results with color measurement results.

With the apparatus, system, and method of the below-described embodiments of the present invention, a color tone reproduction characteristic can be estimated even in a case where one of the image output apparatus is unable to provide a printer profile and print a color chart.

Figure 3:
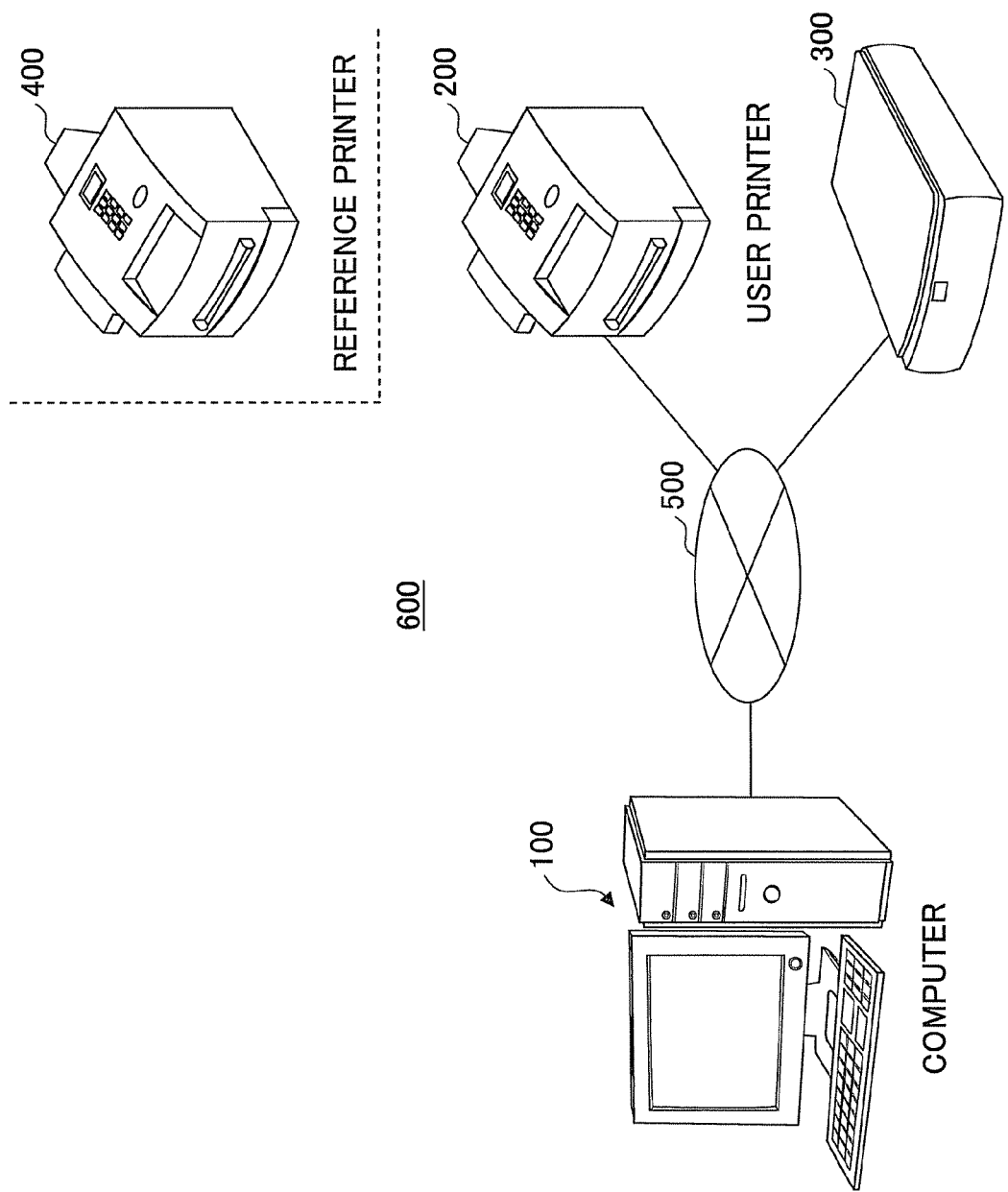
FIG. 3 is a schematic diagram illustrating a configuration of a color transformation parameter generation system according to an embodiment of the present invention.

FIG. 3 is a schematic diagram illustrating a configuration of a color transformation parameter generation system 600 according to an embodiment of the present invention. An example of a process of generating a color tone transformation parameter is described in detail below. First, the flow of performing color tone transformation on an original image data for matching the color tone between first and second image output apparatuses is described.

The terms of apparatuses, image data and the like according to this embodiment are defined as follows.

First image output apparatus: printer (hereinafter also referred to as "reference printer")

Second image output apparatus: printer (hereinafter also referred to as "user printer")

Image reading apparatus: scanner

Reference printer: a printer corresponding to the first image output apparatus and being a printer to which color tone is matched User printer: a printer corresponding to the second image output apparatus and being a printer having its color tone matched to the color tone of the reference printer 400

Scanner: an apparatus corresponding to the image reading apparatus

Original image data: image data used when a printer outputs a printed material

Reference printed material: a printed material being obtained by outputting an original image data from the reference printer 400 and being the target of color tone matching Reference image data: an image data obtained by reading the reference printed material from the image reading apparatus User printed material: a printed material being obtained by outputting an original image data from the user printer 200 and desired to have its color tone matched with that of the reference printed material User image data: image data obtained by reading the user printed material from the image reading apparatus In this embodiment, an original image data, which is to be provided to the user printer 200, is subjected to color tone transformation using the reference printer material and the user printed material. Thereby, the user printed material can attain the same color tone as that of the reference printed material.

The apparatus used to perform color tone transformation may be the second image output apparatus, the scanner 300, or a computer 100 that is independent from the second image output apparatus and the scanner 300. In this embodiment, the computer 100 is used to perform the below-described processes for obtaining a color tone transformation parameter.

(Process 1) Estimating the First Color Tone Reproduction Characteristic

First, the reference color tone reproduction characteristic $S(P_1(x))$ of the reference printer 400 together with the scanner 300 is estimated as follows. It is to be noted that the reference color tone reproduction characteristic $S(P_1(x))$ of the reference printer 400 together with the scanner 300 is estimated due to the difficulty in extracting the reference color tone reproduction characteristic $S(P_1(x))$ of the reference printer 400 alone.

(1-1) The reference image data is obtained by reading the reference printed material with the scanner 300.

(1-2) The position, the tilt, and the size of the reference image data are matched with those of the original image data.

(1-3) The colors of the pixels of the original image data are associated to pixels located in corresponding positions of the reference image data and stored in association with the pixels of the reference image data.

(1-4) It is determined (calculated) which color of the reference image data corresponds to a given pixel value of the original image data based on the pixel values of the associated pixels.

(Process 2) Estimating the Second Color Tone Reproduction Characteristic

Then, the user color tone reproduction characteristic $S(P_2(x))$ of the user printer 200 together with the scanner 300 is estimated as follows.

(2-1) The user printed material is obtained by outputting the original image data from the user printer 200.

(2-2) The user image data is obtained by reading the user printed material with the scanner 300.

(2-3) The position, the tilt, and the size of the user image data are matched with those of the original image data.

(2-4) The colors of the pixels of the user image data are associated to pixels located in corresponding positions of the original image data and stored in association with the pixels of the user image data.

(2-5) It is determined (calculated) which color of the user image data corresponds to a given pixel value of the original image data based on the pixel values of the associated pixels.

(Process 3) Estimating the Color Tone Transformation Parameter

The color tone transformation parameter is obtained by the reference color tone reproduction characteristic and the user color tone reproduction characteristic.

(3-1) The color of the reference image data "s" ($=S(P_1(a))$) corresponding to the color "a" of the original image data is obtained from the reference color tone reproduction characteristic.

(3-2) The color "b" of the original image data corresponding to the color "s" ($=S(P_2(b))$) of the user image data is obtained from the user color tone reproduction characteristic.

(3-3) The color of the reference image data "s" corresponding to the color "a" of the original image data and the color "b" of the original image data corresponding to the color s ($=S(P_2(b))$) of the user image data are associated to each other (i.e. a combination (a, b) which satisfies $S(P_1(a))=s=S(P_2(b))$ is obtained).

(3-4) A color tone transformation parameter is obtained from the two colors (a, b) of the corresponding original image data.

(Process 4) Color Tone Transformation of Original Image Data

Finally, color tone transformation is performed on the original image data using the obtained color tone transformation parameter. Thereby, the original image data is updated.

By performing the above-described processes (1)-(4), the user data printed by the user printer 200 based on the color-tone transformed original image data can attain substantially the same color tone as the color tone of the reference image data. In a case where the user data cannot attain substantially the same color tone as the reference image data by performing the set of processes (1)-(4) once, the set of processes (1)-(4) may be repeated until the difference between the color tone of the reference image data and the color tone of the user image data is within a predetermined range. In the case where the set of processes (1)-(4) is repeated, the original image data that has been subjected to the color tone transformation may be used for estimating the color tone reproduction characteristic of the user printer 200.

It is to be noted that, processes such as estimating the color tone characteristic of the user printer 200 or transforming the color tone may be performed on original image data or original image data which has already been subjected to the color tone transformation process. For example, the color tone transformation process may be performed in 2 types of patterns. The first type is performing the color tone transformation process two times in which color tone transformation is performed on original image data for the first time, and color tone transformation is performed for the second time on the original image data being subjected to the color tone transformation process. The second type is performing the color tone transformation process two times in which color tone transformation is performed on original image data for the first time, then, color tone transformation is performed on original image data for the second time, and then compositing (combining) the results of the first and second color tone transformation processes. The first and the second types of color tone transformation processes may be performed according to circumstance. It is preferable to use the first type in a case where a simple sequential operation is desired. It is preferable to use the second type in a case of avoiding accumulation of error due to performing the color tone transformation process on the original image data for multiple times.

Figure 4:
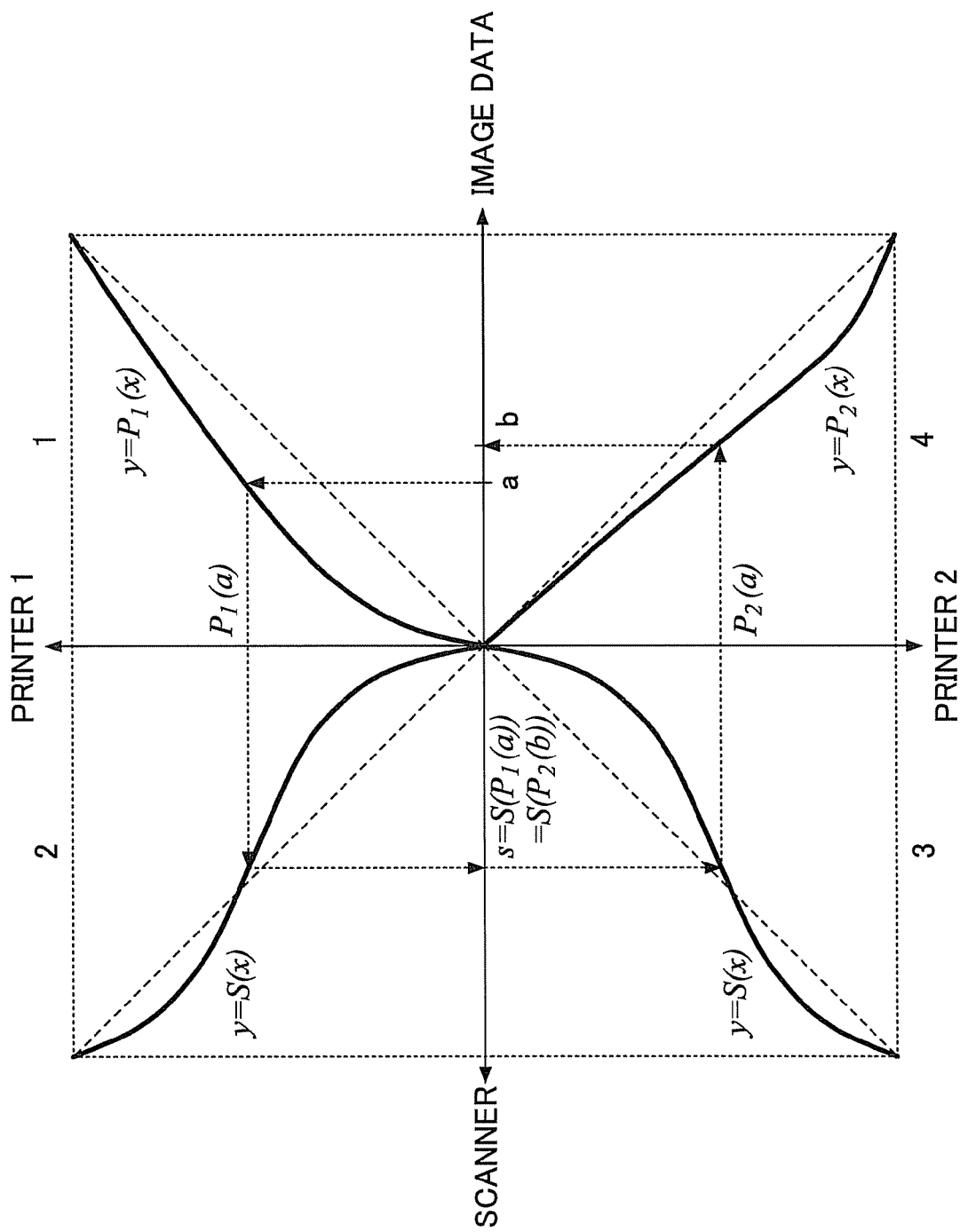
FIG. 4 is a schematic diagram illustrating the generation of a color tone transformation parameter according to an embodiment of the present invention.

FIG. 4 is a schematic diagram illustrating an example of the processes (1)-(3). In FIG. 4, the color tone reproduction characteristic of FIG. 2A is allocated in a first quadrant, the color tone reproduction characteristic of FIG. 2C being inverted in the horizontal direction is allocated in a second quadrant, the color tone reproduction characteristic of FIG. 2C being rotated 180 degrees is allocated in a third quadrant, and the color tone reproduction characteristic of FIG. 2B is allocated in a fourth quadrant.

The processes (1)-(3) may be matched to FIG. 4 as follows. The process of estimating the first color tone reproduction characteristic (process (1)) corresponds to obtaining the first and the second quadrants of FIG. 4, the process of estimating the color tone transformation parameter (process (2)) corresponds to obtaining the third and fourth quadrants of FIG. 4, and the process of estimating the color tone transformation parameter (process 3) corresponds to obtaining the combination (a, b) which satisfies $S(P_1(a))=s=S(P_2(b))$ in accordance with the arrows illustrated in FIG. 4.

Although the color tone reproduction characteristic of the printer together with the scanner 300 is estimated in the above-described processes (1) and (2), the color tone reproduction characteristic of the printer and the color tone reproduction characteristic of the scanner 300 are illustrated separately in FIG. 4 for the sake of convenience.

[Configuration Example]

The color tone transformation parameter generation system 600 illustrated in FIG. 3 includes, for example, the computer 100, the user printer 200, and the scanner 300 that are connected to each other by a network 500. An offset printing machine or a gravure printing machine may be used instead of the user printer 200. Further, a spectral colorimeter or a camera may be used instead of the scanner 300. Because the reference printer 400 is not typically located on the user side of the color tone transformation parameter generation system 600, the reference printer 400 is not connected to the network 500. Alternatively, however, the reference printer 400 may be connected to the network 500. The user of the color tone transformation parameter generation system 600 may have already obtained the reference printed material by outputting the reference image data from the reference printer 400. If the user of the color tone transformation parameter generation system 600 has not yet obtained the reference printed material, the user may obtain the reference printed material by outputting the original image data from the reference printer 400.

The network 500 may be, for example, an intra-office LAN (Local Area Network), a WAN (Wide Area Network), a IP-VNP (Virtual Private Network), the Internet, or a combination of these networks, as long as the computer 100, the user printer 200, and the scanner 300 can communicate with each other. The network 500 may also include a telephone line. The network may perform wired-communications and/or wireless communications.

The reference printer 400 and the user printer 200 do not need to be separate apparatuses and could be the same printer. For example, in the case where the reference printer 400 and the user printer 200 are the same printer, the color tone of the past and the color tone of the present can be matched. As long as a printer function is included in the reference printer 400 and the user printer 200, one or more other functions such as a scanner function, a facsimile function or a copier function may also be included in the reference printer 400 and the user printer 200. Likewise, as long as a scanner function is included in the scanner 300, one or more other functions such as a printer function, a facsimile function, or a copier function may also be included in the scanner 300. An apparatus having multiple functions is hereinafter also referred to as an MFP (Multi-Function Peripheral).

Further, in this embodiment, the computer 100 estimates the color tone transformation parameter based on 3 types of image data. The first is the original image data (image data used by the reference printer 400 for outputting the reference printed material), the second is the reference image data (image data obtained by reading the reference printed material with the scanner 300), and the third is the user image data (image data obtained by reading the user printed material output by the printer 200 in accordance with the original image data). The original image data may be stored beforehand in the user printer 200. Alternatively, the user printer 200 may obtain the original image data from the reference printer 400. The computer 100, the user printer 200, and the scanner 300 may be mounted in a single MFP.

Figure 5:
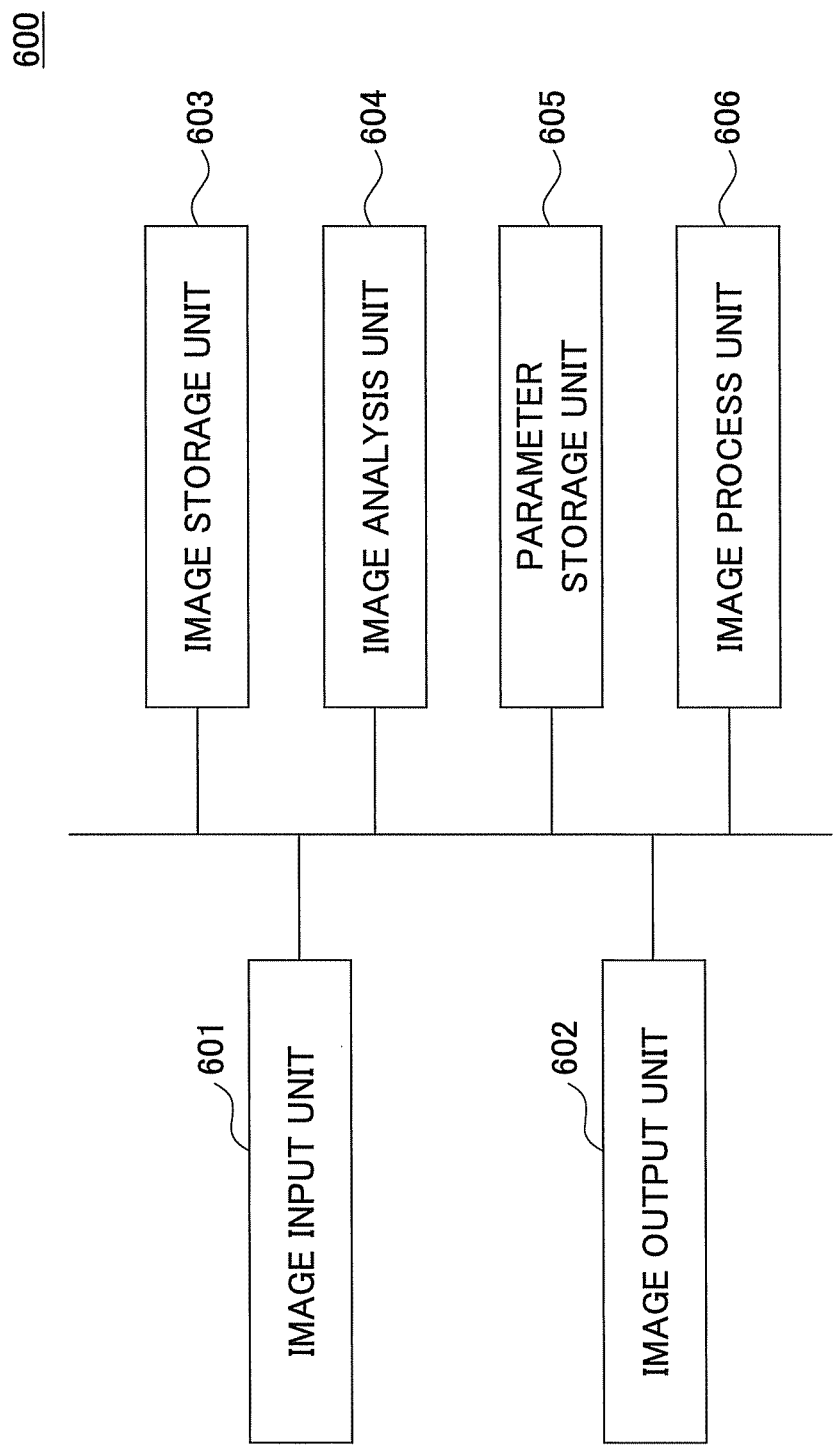
FIG. 5 is a schematic diagram illustrating a hardware configuration of a color tone transformation parameter generation system according to an embodiment of the present invention.

FIG. 5 is a schematic diagram illustrating a hardware configuration of the color tone transformation parameter generation system 600 according to an embodiment of the present invention. The color tone transformation parameter generation system 600 includes an image input unit 601, an image output unit 602, an image storage unit 603, an image analysis unit 604, and a parameter storage unit 605, and an image process unit 606.

The image input unit 601 is for inputting an image output from an image output apparatus. The image input unit 601 corresponds to the scanner 300. The image storage unit 603 is for storing image data obtained by receiving input from the image input unit 601. The image storage unit 603 corresponds to the computer 100 in FIG. 3. The image analysis unit 604 is for generating a color tone transformation parameter(s) by analyzing the reference image data, the user image data, and the original image data. The image analysis unit 604 also corresponds to the computer 100 in FIG. 3. The parameter storage unit 605 is for storing the color tone transformation parameter(s) obtained by analyzing image data. The parameter storage unit 605 also corresponds to the computer 100 in FIG. 3. The image process unit 606 is for performing color tone transformation on image data based on the generated color tone transformation parameter. The image process unit 606 corresponds to the user printer 200 in FIG. 3. The image output unit 602 is for outputting an image having its color tone converted. The image output unit 602 corresponds to the user printer 200 in FIG. 3.

Figure 6:
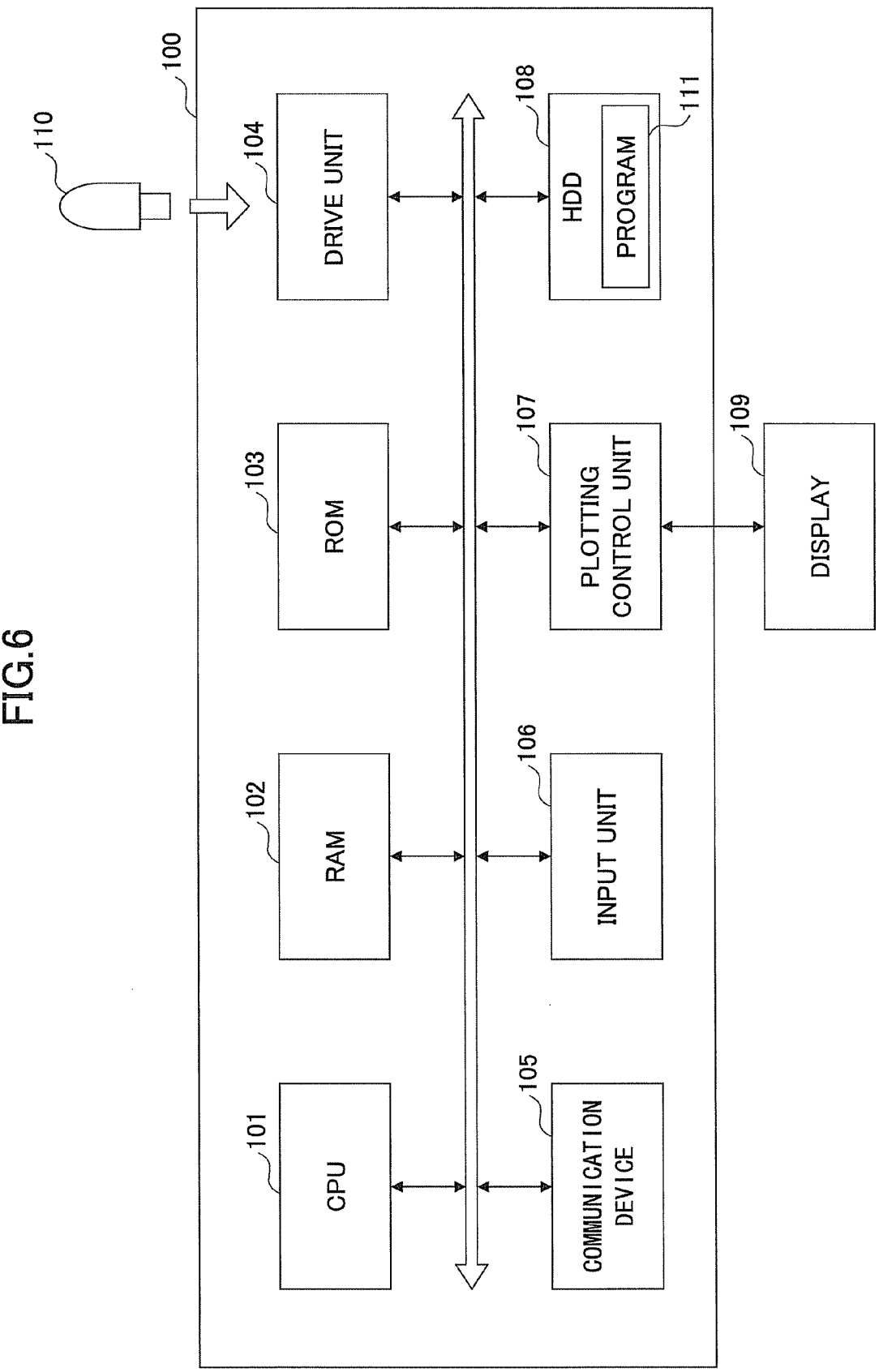
FIG. 6 is a schematic diagram illustrating a hardware configuration of a computer according to an embodiment of the present invention.

FIG. 6 is a schematic diagram illustrating a hardware configuration of the computer 100 according to an embodiment of the present invention. The computer 100 includes a CPU (Central Processing Unit) 101, a RAM (Random Access Memory) 102, a ROM (Read-Only Memory) 103, a drive unit (recording medium mounting unit) 104, a communication device 105, an input unit 106, a plotting control unit 107, and a HDD (Hard Disk Drive) 108. The CPU 101 provides various functions by executing an OS (Operating System) and programs read from the HDD 108. The CPU 101 also performs the process of generating the color tone transformation parameter(s).

The RAM 102 is a memory (main storage memory) for temporarily storing data required for enabling the CPU 101 to execute a program. The ROM 103 is for storing, for example, programs and static data for activating the BIOS (Basic Input Output System) and the OS.

The drive unit 104 can have a computer-readable recording medium 101 mounted thereon. The drive unit 104 is for reading data recorded on the computer-readable recording medium 101 and storing the read data to the HDD 108. The drive unit 104 is also for writing data stored in the HDD 108 to the computer-readable recording medium 110. The computer-readable recording medium 101 may be, for example, USB (Universal Serial Bus) memory or an SD (Secure Digital) card. A program 111 may be distributed in the form of being recorded in the computer-readable recording medium 110 or in the form of being downloaded from a server (not illustrated).

The input unit 106 may be, for example, a keyboard, a mouse, or a trackball for receiving various maneuvers and instructions from the user to the computer 100.

The HDD 108 may be, for example, a non-volatile memory such as SSD (Solid State Drive) for storing the OS, programs and various data including image data.

The communication device 105 may be, for example, a NIC (Network Interface Card) for connecting the computer 100 to a network 301 such as the Internet. The NIC may be, for example, an Ethernet (registered trademark) card.

The plotting control unit 107 is for interpreting a plotting command written to a graphic memory, generating a screen, and plotting the screen on a display 109 by executing the program 111 with the CPU 101.

Figure 7:
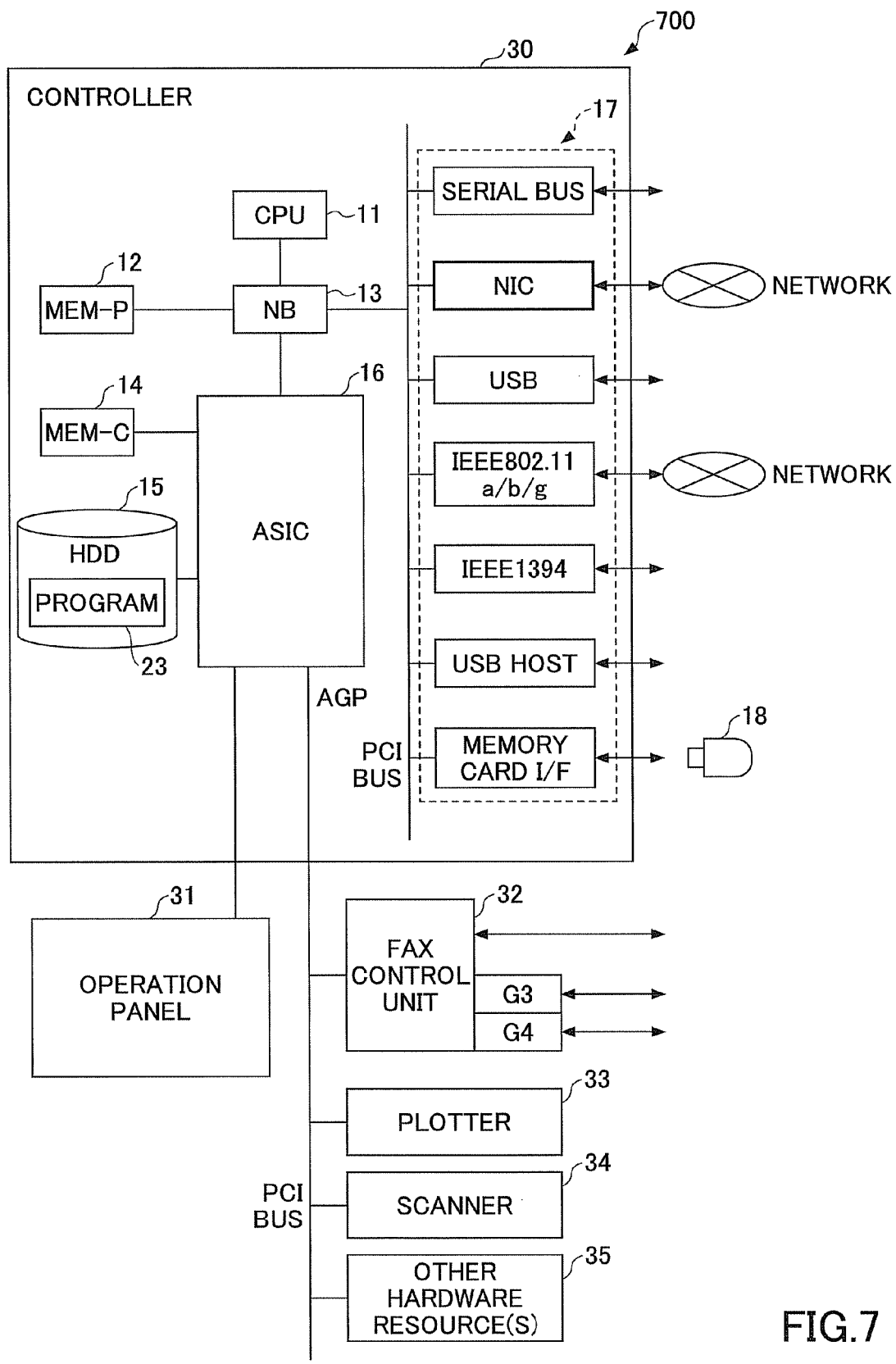
FIG. 7 is a schematic diagram illustrating a hardware configuration of a MFP in a case where a color tone transformation parameter generation system is established with a single MFP according to an embodiment of the present invention.

FIG. 7 is a schematic diagram illustrating a hardware configuration of a MFP 700 in a case where the color tone transformation parameter generation system 600 is established with a single MFP. The MFP 700 includes, for example, a controller 30, an operation panel 31, a facsimile control unit 32, a plotter 33, a scanner 34, and other hardware resource(s) 35. The controller 30 includes a CPU 11, a MEM-P 12, a NB (North Bridge) 13, an ASIC (Application Specific Integrated Circuit) 16, a MEM-C 14, a HDD 15, and a peripheral device 17 connected to the NB 13 via a PCI (Peripheral Component Interconnect) bus.

In the controller 30, the MEM-C 14, the HDD 15, and the NB 13 are connected to the ASIC 16. The CPU 11 and the MEM-P 12 are connected to the NB 13. The NB 13 is a part of a CPU chip set. The NB 13 is a bridge for connecting, for example, the CPU 11, the MEM-P 12, the ASIC 16, and the peripheral device 17.

The ASIC 16 is an IC suited for image processing purposes. Various image processes can be performed with the ASIC 16. The ASIC 16 also acts as a bridge that connects an AGP (Accelerated Graphics Port), the HDD 15, and the MEM-C14. The CPU 11 performs overall controls of the MFP 700. The CPU 111 also activates various applications installed in the MFP 700 and executes the applications.

The MEM-P12 is a system memory used by the system of the MFP 700. The MEM-C14 is a local memory used as a buffer of image data during image processing.

The HDD 15 is a large capacity storage device. A SSD (Solid State Drive) may be used for the HDD 15. The various data such as OS, various applications, font data are stored in the HDD 15. Further, the program 23 for performing the process of generating the color tone transformation parameter is stored in the HDD 15. The program 23 may be distributed by being recorded on the computer-readable recording medium 18 or by being downloaded from a server (not illustrated).

The peripheral device 17 may include, for example, a serial bus, a NIC, a USB host, a IEEE 802.11a/b/g/n, an IEEE 1394, and a memory card I/F. For example, a centronics cable may be connected to the serial bus. The NIC controls communications performed by way of the network. A device may be connected to the USB host by way of a USB cable. The IEEE 802.11a/b/g/n are wireless LAN interfaces complying to corresponding IEEE standards. The IEEE 802.11a/b/g/n are for controlling communications by way of a wireless LAN. The IEEE 1394 is an interface for controlling high speed serial communications. Various memory cards can be connected to the memory card I/F. The memory card I/F performs reading and writing of data on the various memory cards. The memory card may be, for example, an SD card, a multimedia card, or an xD card.

The control panel 31 may include, for example, a hard-key unit such as a keyboard and a display unit such as a liquid crystal display. The control panel 31 is for receiving input various maneuvers and instructions input from the user and displaying various data on a screen for the user. The control panel 31 may also include a soft-key unit such as a touch panel for enabling the user to input maneuvers and instructions with the keys displayed in the touch panel.

The facsimile control unit 32 is connected to a public communications network via an NCU (Network Control Unit). The facsimile control unit 32 performs facsimile transmission/reception by using communication protocols corresponding to a facsimile such as the G3 standard or the G4 standard. The facsimile control unit 32 performs various signal processing (e.g., data compression, modulation) on the image data and transmits the processed image data. The facsimile control unit 32 also performs various processes (e.g., data extension, error correction) on the image data received from a communications partner and reconstitutes (restores) the received image data.

The plotter 33 includes, for example, a monotone plotter or a color plotter based on electrophotographic method. The plotter 33 forms an image per page based on a target printing data or image data read by the scanner 34 and transfers the image to a sheet(s) of paper. For example, in a case where an electrophotographic method using a laser beam is used, an image data is output by transferring a toner image formed on a photoconductor drum to a sheet of paper and fixing the toner image to the paper by applying heat and pressure with a fixing device. Further, an image output may be output (printed) by ejecting ink droplets to a sheet of paper.

The scanner 34 generates image data by optically scanning an original placed on a contact glass, performing A/D conversion on the light reflected by the scanning, and performing a known image process on the A/D converted data, and converting the image processed data to digital data having a predetermined resolution.

In the MFP 700 of FIG. 7, the image input unit 601 of FIG. 5 corresponds to the scanner 34, the image output unit 602 of FIG. 5 corresponds to the plotter 33, the image storage unit 603 of FIG. 5 corresponds to the HDD 15, the image analysis unit 604 corresponds to the CPU 11, the parameter storage unit 605 corresponds to the HDD 15, and the image process unit 606 corresponds to the ASIC 16.

Figure 8:
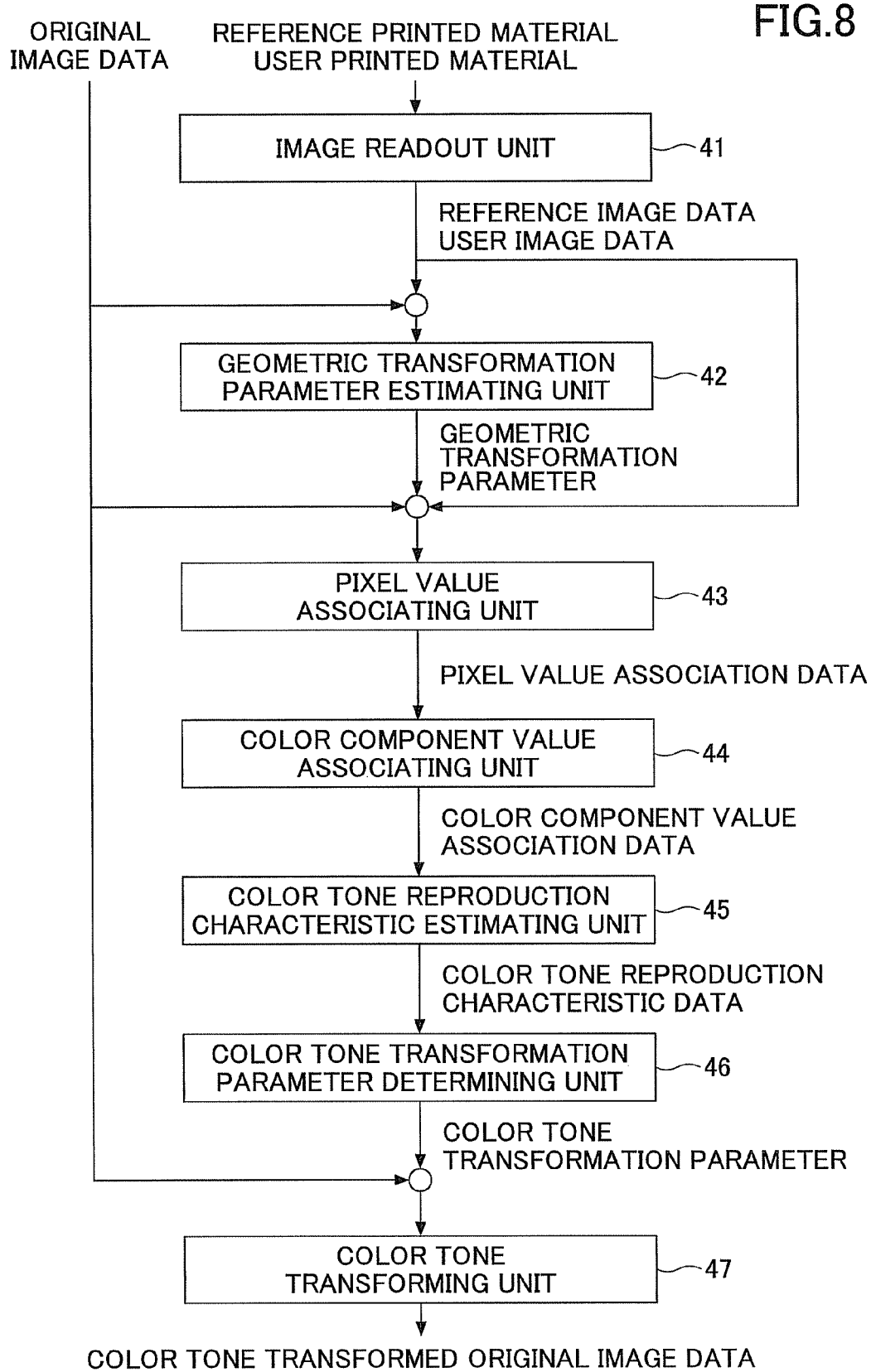
FIG. 8 is a functional block diagram of a color tone transformation parameter generation system or a MFP according to an embodiment of the present invention.

FIG. 8 is a functional block diagram of the color tone transformation parameter generation system 600 or the MFP 700 according to an embodiment of the present invention. The color tone transformation parameter generation system 600 or the MFP 700 includes, for example, an image reading unit 41, a geometric transformation parameter estimating unit 42, a pixel value associating unit 43, a color component value associating unit 44, a color tone reproduction characteristic estimating unit 45, a color tone transformation parameter determining unit 46, and a color tone transforming unit 47.

The image reading unit 41 reads the results of outputting original image data (i.e. reference printed material) and user printed material and generates reference image data and user image data.

The geometric transformation parameter estimating unit 42 estimates geometric transformation parameters between original image data and reference image data and geometric transformation parameters between original image data and user image data.

The pixel value associating unit 43 detects pixels of the reference image data corresponding to pixels of the original image data by using the geometric transformation parameters, associates the pixels of the reference image data to the pixels of the original image data, and generates pixel value association data indicative of the associated pixels of the original image data and the reference image data. Similarly, the pixel value associating unit 43 detects pixels of the user image data corresponding to pixels of the original image data by using the geometric transformation parameters, associates the pixels of the user image data to the pixels of the original image data, and generates pixel value association data indicative of the associated pixels of the original image data and the user image data.

The color component value associating unit 44 obtains the value of each color component of the original image data in correspondence with the value of each color component of the reference image data. Further, the color component value associating unit 44 obtains the value of each color component of the original image data in correspondence with the value of each color component of the user image data. Then, the color component value associating unit 44 generates color component value association data indicative of the associated values of the color components of the original image data, the reference image data, and the user image data.

The color tone reproduction characteristic estimating unit 44 estimates the color tone reproduction characteristic data by using the color component value association data.

The color tone transformation parameter determining unit 46 determines the color tone transformation parameter by using the color tone reproduction characteristic data.

The color tone transformation unit 47 performs color tone transformation on the original image data by using the color tone transformation parameter.

FIG. 9 is a flowchart illustrating the steps including, for example, reading the reference printed material and the user printed material with the image reading unit 41 and generating color tone reproduction characteristic data with the color tone reproduction characteristic estimating unit 45. In the following flowchart, the reference printed material and the user printed material are processed in parallel. However, in reality, the reference printed material and the user printed material are, in most cases, processed sequentially.

The image reading unit 41 reads a reference printed material and a user printed material and generates reference image data and user image data (Step S101).

Then, the geometric transformation parameter estimating unit 42 matches the positions between the original image data and the reference image data and the positions between the original image data and the user image data (Step S102).

Before the matching of the positions between two types of image data, the geometric transformation parameter estimating unit 42 obtains the geometric transformation parameter of the reference image data (or the user image data) in a case where the original image data is used as a reference (standard) for matching the positions. The geometric transformation parameter may be, for example, displacement, rotation angle, or magnification. Known methods may be used for estimating the geometric parameter. The methods for estimating the geometric parameter may be, for example, a method using a marker, a method of pattern matching using no marker, or a method of phase-only correction.

a) Method of Using a Marker(s)

Figure 10A:
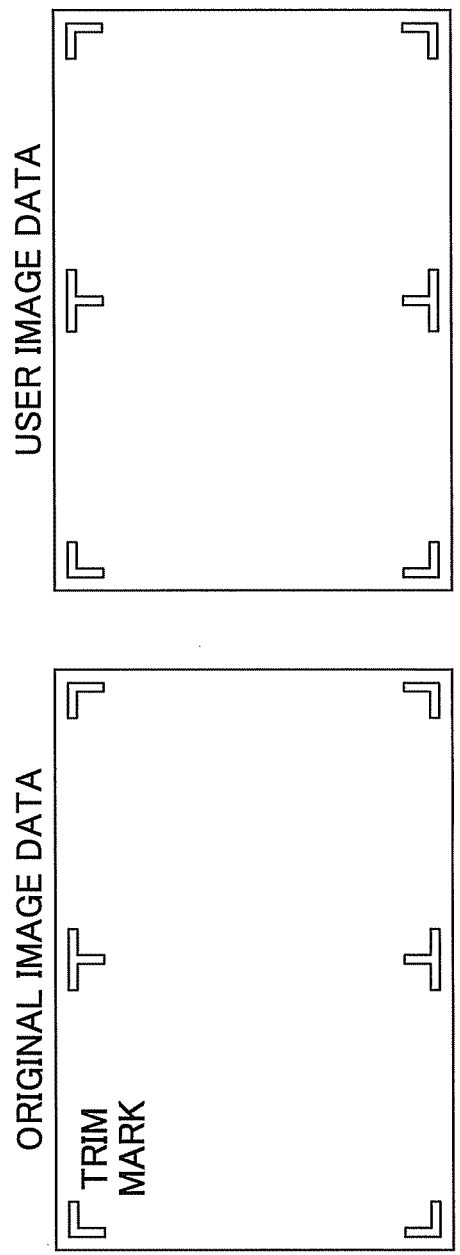
FIGS. 10A and 10B are schematic diagrams for describing estimation of a geometric transformation parameter according to an embodiment of the present invention.

With this method, a marker referred as a trim mark is allocated in each of the four corners of an original image data and/or at the center of each of the sides of an original image data (see, for example, FIG. 10A). Then, the original image data including the allocated trim marks is output. Then, the displacement, the rotation angle, or the magnification is obtained based on the displacement of the position of the trim marks in a case where reference image data and user image data are read out.

FIG. 10A is a schematic diagram illustrating an example of the trim marks. In this example, image data and 4-6 trim markers are formed in a single sheet of recording paper. Assuming that the relative positions of a trim mark(s) and an image data are the same between the original image data and the user image data, the geometric transformation parameter is obtained by comparing the amount of position displacement between the trim marks of corresponding positions. Because the position of the trim mark relative to the edge of a recording paper is roughly known beforehand, the position of the trim mark can be detected by performing a process of detecting the trim mark located within a predetermined range from the edge of the recording paper.

Figure 10B:
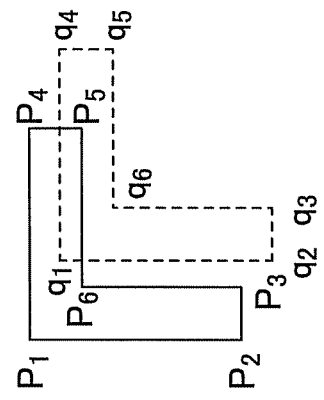

FIG. 10B is a schematic diagram illustrating an example for describing displacement of the trim mark. In FIG. 10B, "$P_n$" ("n" being an integer greater than or equal to 1) indicates a position of a feature point of a trim mark of an original image data, "$q_n$" indicates a feature point of a trim mark of a reference image data. In a case where there is no displacement of position, the position of point $P_1$ and the position of point $q_1$, the position of point $P_2$ and the position of point $q_2$, the position of point $P_3$ and the position of point $q_3$, . . . would match, respectively. Accordingly, the geometric transformation parameter can be calculating the relationship between corresponding points by using a known method. For example, there is a known method of matching two point patterns by performing affine transformation on either one of two images. Thus, the geometric transformation parameter can be obtained by finding an optimum parameter in which the positions of two point patterns are nearest to each other. For example, after defining an evaluation function of an affine parameter for performing affine transformation on points $P_1$-$P_6$, an affine parameter in which the evaluation function becomes minimal is determined as the geometric transformation parameter.

b) Method of Using Pattern Matching

One example of a method for estimating displacement is a template matching method. The template matching method is performed by assuming either one of two images as a template, obtaining the degree of match (coincidence) with respect to the other image by gradually shifting position of the image, and detecting a position where the degree of match is highest. In a case where geometric transformation is not only limited to displacement, a method of estimating rotation angle (e.g., Hough transform) or a method of estimating the magnification (e.g., multiscale modeling) may be performed in combination with the method of using pattern matching.

In a case where a block matching method which uses the pattern matching method, displacement can be obtained by dividing one of two images into blocks and detecting, in units of blocks, a position at which the degree of match becomes highest with respect to the other image. With the block matching method, rotation angle or magnification can also be estimated based on the displacement of each block.

c) Method of Using Phase-Only Correlation

As a method for obtaining displacement, rotation angle, or magnification with high accuracy, there is, for example, a POC (Phase-Only Correlation) method and a RIPOC (Rotation Invariant Phase-Only Correlation) method. With the POC method, phase images are obtained by performing discrete Fourier transform on an image. Then, displacement is calculated by referring to the obtained phase images and detecting a position from which a highest correlation can be derived from two phase images obtained from two images to be compared (comparison objects). Further, with the RIPOC method, the rotation angle and the magnification can be detected as displacement in the phase images by performing log polar mapping on the phase images.

After obtaining the geometric transformation parameter, the geometric transformation parameter estimating unit 42 executes geometric transformation on the reference image data (or user image data). In a case where pixels before the performing of geometric transformation do not match pixels after the performing of geometric transformation (i.e. pixels prevented from matching one on one) due to shifting of sub-pixel precision, rotation, or magnification of a real value during the performing of the geometric transformation, pixel values may be derived by discretionally using an interpolation method. The interpolation method performed on the pixels may be, for example, a bilinear method or a bi-cubic method.

It is, however, to be noted that the process of geometric transformation may be omitted. Alternatively, whether corresponding pixels are located in the same position may be determined by performing coordinate transformation. In this case, the coordinate transformation is performed by using a geometric transformation parameter when obtaining pixels of corresponding positions in the original image data and the reference image data (or the user image data) in a subsequent step. Even if coordinate values are different in a coordinate system having an origin of each image as its reference point, pixels having the same coordinate value are assumed as pixels of the same position as a result of geometric transformation.

A printed material may have blank parts surrounding a pixel when an original image data is output. In such a case, the blank parts are not taken into consideration because the height and width of the blank parts are included in the displacement of geometric transformation. However, the position of the origin of each image may be matched by removing parts required for excluding the blank parts from output image data.

Then, the pixel value associating unit 43 associates the pixel values of the original image data with the pixel values of the reference image data (or user image data) corresponding to pixels located in the same positions as those of the original image data (Step S103). In other words, after matching the positions between the original image data and the reference image data (or the user image data) is completed, the pixel values of corresponding pixels between the original image data and the reference image data (or the user image data) are obtained. Then, the pixel values of the original image data are associated to corresponding pixel values of the reference image data (or the user image data). Thereby, pixel value association data is generated based on the associated pixel values. In a case of matching positions by performing geometric transformation on image data, a corresponding pixel indicates a pixel located in a same position. On the other hand, in a case of matching positions without performing geometric transformation, pixels are assumed to be located in the same position if the same coordinate values are obtained by coordinate transformation. Thus, in this case, pixels having the same coordinate values are assumed as corresponding pixels.

As a method of associating pixel values and recording the pixel values, there is, for example, a method of recording in a list format or a matrix format. For example, in a case where both the original image data and the reference image data (or user image data) are RGB images in which each color component of R, G, B has 256 gradations, the recording of pixel values are described as follows.

a) Recording in a List Format

Recording of color component values to a list is performed as follows:

a-1) Prepare 3 lists;
a-2) Select coordinates in which the original image data is located;
a-3) Associate R component values of the pixels corresponding to the coordinates of the original image (selected in a-2)) to R component values of the pixels of corresponding reference image data (or user image data) and add associated R component values to a R component list;
a-4) Likewise, add associated G component values to a G component list, and add associated B component values to C component list; and
a-5) Repeat a-2) to a-4) with respect to all of the coordinates of original image data.

The items in the list may be rearranged in an ascending order or a descending order according to necessity.

b) Recording in a Matrix Format

Voting a corresponding relationship of color component values with respect to a matrix is performed as follows. In this case, the vertical axis represents values of original image data, and the horizontal axis represents values of reference image data (or user image data).

b-1) Prepare 3 matrices each having 256 rows and 256 columns;
b-2) Select coordinates in which the original image data is located;
b-3) Cast a vote for an intersecting location at which a row of a R color component of a pixel corresponding to the coordinates of the original image data (selected in b-1)) intersects a column of an R color component of a pixel corresponding to the coordinates of reference image data (or user image data) in a R color component matrix;
b-4) Likewise, cast a vote for a corresponding relationship of G color components in a G color component matrix, and cast a vote for a corresponding relationship of B color components in a B color component matrix; and
b-5) Repeat b-2) to b-4) with respect to all of the coordinates of original image data.

More specifically, in a case where the pixel value data of pixels of coordinates in which the original image data is located is (128, 130, 132) in the order of RGB, and the pixel values of corresponding pixels of the reference image data (or user image data) is (132, 130, 126), the matrix corresponding to the R color component is selected from the 3 matrices and a vote is cast for row 128 and column 132. Likewise, a vote is cast for row 130 and column 130 of the matrix corresponding to the G color component, and a vote is cast for row 132 and column 126 of the matrix corresponding to the B color component. Whether the values of the original image data or the values of the reference image data (user image data) should be allocated to the vertical axis, and whether the values of the original image data or the values of the reference image data (user image data) should be allocated to the horizontal axis may be determined according to necessity.

Regardless of whether the recording is performed with the in the list format or the matrix format, the range in which the recording is performed or the coordinates may be moved a predetermined stride, so that processing can be simplified compared to repeating the above-described processes on all of the coordinates of the original image data.

Then, the color component value associating unit 44 associates the values of corresponding color components between the original image data and the reference image data (or user image data) (Step S104). That is, by using the pixel value association data, it can be calculated which color component values of the original image data correspond to the color component values of the reference image data (or user image data). As a result, the color component value association data is generated.

Similar to the above-described Step S102, a case where both the original image data and the reference image data (or user image data) are RGB images (in which each color component of R, G, B has 256 gradations) is described as follows.

a) Case where Pixel Value Association Data is Recorded in a List Format

In a case where pixel value association data is recorded in the form of a list, the following steps are performed.

a-1) Select a given value of a given color component of original image data;
a-2) Obtain list corresponding to color component selected in a-1);
a-3) Obtain all records corresponding to values selected in a-1) from the list obtained in a-2);
a-4) Composite color component values of the reference image data (or user image data) in all of the records obtained in a-3);
a-5) Associate the color component value of the original image data selected in a-1) to the color component value composited in a-4), and record the associated data as color component value association data; and
a-6) Repeat a-1) to a-5) with respect to each value of each color component.

In a case where only one record is obtained in step a-3), the value of the obtained record is used as-is in step a-4) by the color component value associating unit 44. In a case where multiple records are obtained in step a-3), the values of the reference image data (or user image data) are composited to a single value, so that the composite value is used in step a-4) by the color component value associating unit 44. As a method of compositing multiple values, there is, for example, a method of using an average value, a method of using a mode value, or a method of using a median value.

b) Case where Pixel Value Association Data is Recorded in a Matrix Format

In a case where pixel value association data is recorded in the form of a matrix, the following steps are performed.

b-1) Select a given value of a given color component of original image data;

b-2) Obtain matrix corresponding to color component selected in b-1);

b-3) Extract row corresponding to value selected in b-1) from the matrix obtained in b-2);

b-4) Composite values of rows voted from the rows extracted in b-3);

b-5) Associate the color component value of the original image data selected in b-1) to the color component value composited in b-4), and record the associated data as color component value association data; and b-6) Repeat b-1) to b-5) with respect to each value of each color component.

In a case where only one row is obtained in step b-3), the value of the obtained row is used in step b-4). In a case where there are votes for multiple columns in step b-4), the values of the columns are composited to a single value, so that the composite value is used in step b-4). The method of compositing multiple values may be the same as the above-described method a). In this case, however, the number of votes are used as the number of times of appearances of the column number.

Supposing a case where there is an unused color component value in the original image data, it is preferable to record data indicating whether there is an unused color component value data in the original image data. The recorded unused color component value data may be used in a subsequent step described below.

Then, the color tone reproduction characteristic estimating unit 45 estimates a color tone transformation characteristic (Step S105). The color tone reproduction characteristic estimating unit 45 may estimate a color tone transformation characteristic by using data series of the color component value association data. The color tone reproduction characteristic estimating unit 45 may use the color component value association data as-is or use the color component value association data after performing a given process on the color component value association data. The purpose for performing such process is for preventing values from changing drastically or for improving stability of a characteristic curve.

As for a method of processing the color component value association data and using the processed color component value association data, there are the following methods.

a) Use of Moving Average

There is a method of performing a weighted average process on target data of the data series, data preceding the target data (preceding data), and data succeeding the target data (succeeding data). The reference range for referring to the preceding data and the succeeding data may be determined according to the smoothness desired with respect to the data series. In order to attain greater smoothness, the reference range is to be wide. The weight of the weighted average process may be constant value with respect to all data. Alternatively, the weight of the weighted average process may be in inverse proportion to the distance from the target data.

Before using the moving average, it is necessary to rearrange the data series in an ascending order or a descending order. Further, in case where there is an unused color component value in the original image data, an element of the data series would be missing when the data series is rearranged. Therefore, it is necessary to remove the unused color component value from the weighted average for preventing the missing element from adversely affecting other data. Whether there is a missing element can be determined, for example, by determining whether the data is consecutive or by referring to unused color component value recorded in the previous step.

b) Approximating with Straight Line or Curved Line

There is a method of approximating the data series by using, for example, a linear function, a quadratic function, a spline function, or a exponential function.

c) Interpolating or Approximating with Straight Line or Curved Line after Reduction of Gradation Number Examples of a method of reducing the gradation number of a data series of color component value association data are as follows.

A) Evenly Dividing a Value Area of Gradation.

Thereby, the data of the gradations to be combined are composited. The number for dividing the gradations (gradations to be combined) or the width of dividing the gradation may be determined beforehand. Alternatively, the number for dividing the gradations or the width of dividing the gradation may be determined dynamically.

Figure 11A:
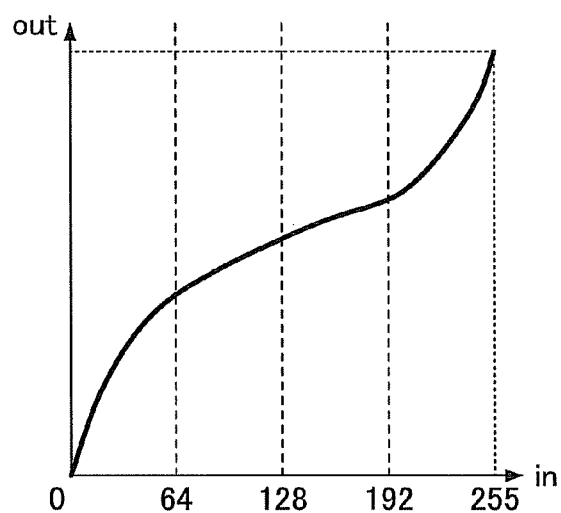
FIGS. 11A-11C are schematic diagrams for describing examples where the number of divisions and the width of each division are determined beforehand.

A-1) Case of Determining the Number of Divisions and The Width of Each Division Beforehand FIG. 11A is a schematic diagram for describing an example where the number of divisions and the width of each division are determined beforehand. In FIG. 11A, 256 gradations (from 0 to 255) are evenly divided with a predetermined dividing number (in this example, 4). Accordingly, in this example, 256 gradations are divided into four regions which are 0 to 63, 64 to 127, 128 to 191, and 192 to 255. Each of the 64 gradations is reduced to a single gradation (i.e. combined to become a single transformation characteristic). The same results as the predetermined dividing number can be obtained by using a predetermined dividing width.

A-2) Case of Dynamically Determining the Number of Divisions and the Width of Each Division As a method for dynamically determining the number of divisions or the width of each division for evenly dividing gradations, there is, for example, a method of determining in proportion to the number of pixels. With this method, the dividing number may be a value obtained by dividing the number of pixels with a number determined in accordance with experience.

B) Unevenly Dividing a Value Area of Gradation.

Thereby, the data of the gradations to be combined are composited. By using the cast number of votes for the pixel value association data corresponding to each gradation, the dividing width is adaptively determined so that the cast votes of the gradations to be composited becomes a predetermined number.

Figure 11B:
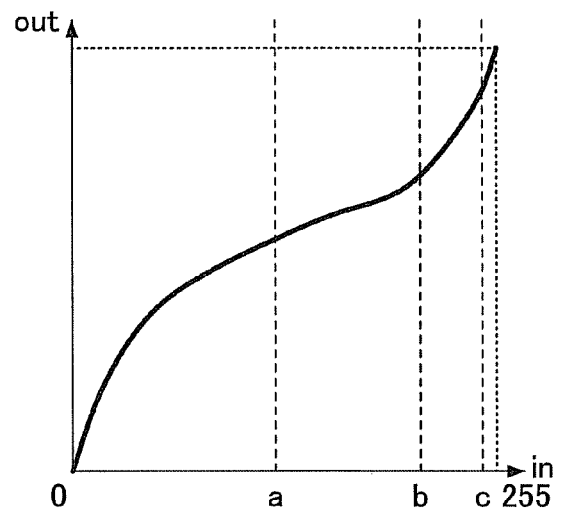

FIG. 11B is a schematic diagram having 256 gradations (0 to 255) being unevenly divided into 4 regions. In this example, the 256 gradations are divided into regions of 0 to (a-1), a to (b-1), b to (c-1), and c to 255. Each of the regions is reduced to a single gradation. The gradation to which gradations a, b, and c is combined is determined discretionarily.

In a case of unevenly dividing the gradations, a method for determining the gradations to be combined may be, for example, i) dividing the cumulative frequency of the number of pixels belonging to each gradation, or ii) using a histogram of the frequency of the number of pixels belonging to each gradation.

i) Method of Using Cumulative Frequency of the Number of Pixels Belonging to Each Gradation With this method, the cumulative frequency of the number of pixels belonging to each gradation is evenly divided into segments, and gradations are divided in correspondence with the positions of the segments of the cumulative frequency.

Figure 11C:
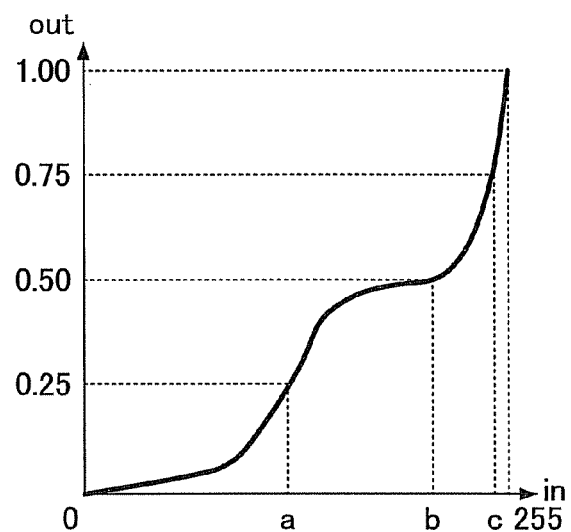
Figure 12A:
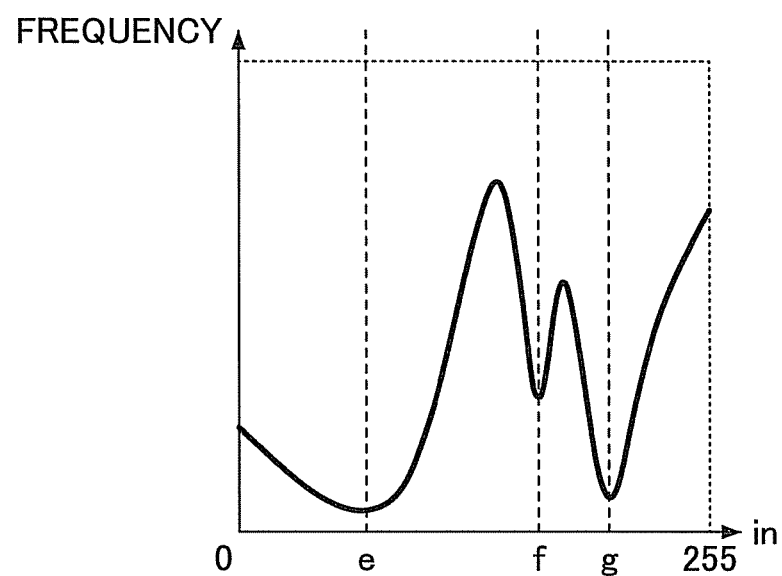
FIGS. 12A-12B are schematic diagrams for describing examples where gradation of original image data is reduced.

FIG. 11C illustrates an example where 256 gradations (0 to 255) are unevenly divided into 4 regions. In a case where the maximum value of the cumulative frequency of the vertical axis is assumed as 1.0, gradations corresponding to the positions of segments 0.25, 0.50, and 0.75 of the cumulative frequency are obtained. Accordingly, the obtained gradation is determined as the position at which gradation is to be divided. In this example, gradation a is derived as having a cumulative frequency of 0.25, gradation b is derived as having a cumulative frequency of 0.50, and gradation c is derived as having a cumulative frequency of 0.75. Thereby, 4 regions can be determined. By dividing gradations in this manner, the number of pixels (to which each transformation characteristic is assigned) can be made equal.

ii) Method of Using Frequency Distribution of the Number of Pixels Belonging to Each Gradation FIG. 12A illustrates a method for dividing gradation by preparing a histogram of the frequency of the number of pixels belonging to each gradation and dividing gradations at positions corresponding to gradations e, f, and g where frequency is minimal. By dividing gradations in this manner, the number of pixels at which transformation characteristic is switched can be reduced.

Accordingly, in a case where the number of gradations is reduced, interpolation may be performed on the combined gradations or approximation using a straight line or a curved lined based on combined data may be performed, so that the number of gradations can be recovered to its initial number.

Figure 12B:
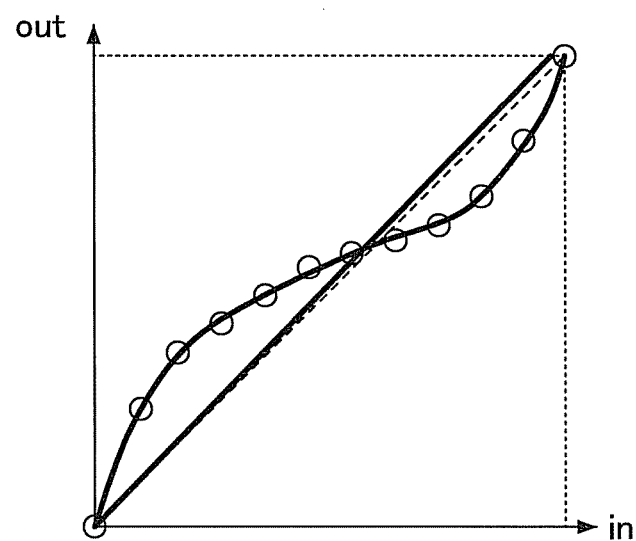

FIG. 12B illustrates an example where the reduced number of gradations is returned to its initial number by using linear approximation or curve approximation. In FIG. 12B, the circles indicate combined data, the solid straight line indicates an example of linear approximation, and the solid curved line indicates an example of curve approximation. It is preferable for the function used for approximation to selected in correspondence with the tendency of the combined data. By performing such interpolation and approximation (e.g., linear approximation, curve approximation), specific transformation due to a small number of pixels can be excluded from the estimated transformation characteristic.

Next, determining of a color tone transformation parameter according to an embodiment of the present invention is described.

FIG. 13 is a flowchart illustrating an example of an operation of generating color tone transformation parameter by the color tone transformation parameter generation system 600 or the NFP 700 according to the first embodiment of the present invention.

In FIG. 13, Step S110 "estimate color tone reproduction characteristic of reference printer" and Step S150 of "estimate color tone reproduction characteristic of user printer" have been described with reference to FIG. 9. In this embodiment, Steps S110 and S150 need only to be performed once. However, if Steps S110 and S150 are performed to be performed multiple times, the image data to be used may be the initial original image data and not image data that has been subjected to color tone transformation.

It is to be noted that, processes such as estimating the color tone characteristic of the user printer 200 or transforming the color tone may be performed on original image data or original image data which has already been subjected to the color tone transformation process. For example, the color tone transformation process may be performed in 2 types of patterns. The first type is performing the color tone transformation process two times in which color tone transformation is performed on original image data for the first time, and color tone transformation is performed for the second time on the original image data being subjected to the color tone transformation process. The second type is performing the color tone transformation process two times in which color tone transformation is performed on original image data for the first time, then, color tone transformation is performed on original image data for the second time, and then compositing (combining) the results of the first and second color tone transformation processes. The first and the second types of color tone transformation processes may be performed according to circumstance. It is preferable to use the first type in a case where a simple sequential operation is desired. It is preferable to use the second type in a case of avoiding accumulation of error due to performing the color tone transformation process on the original image data for multiple times.

Then, the original image data is printed with the user printer 200 by the user (Step S120). By printing the original image data with the user printer, the user printed material can be obtained. The user uses the scanner 34, 300 (hereinafter also collectively referred to as "scanner 300") to read the user printed material.

The color tone transformation parameter determining unit 46 evaluates the user printed material (Step S130). Then, the quality of the user printed material is evaluated by comparing the user printed material with the reference printed material (Step S140).

In a case where the quality of the user printed material is satisfactory (Yes in Step S140), the operation is terminated. In a case where the quality of the user printed material is unsatisfactory (No in Step S140), the operation proceeds to Step S150.

As a method for evaluating the quality of the user printed material, there is, for example, a method of using color difference with respect to the reference printed material. As another method for evaluating the quality of the user printed material, there is a method of using hue difference. There is also a method of using the difference of the absolute value of each color component. The evaluation of quality may be performed by visual observation.

a) Evaluation Method Using Color Difference

Color difference is the distance between two colors in a L*a*b* color space or a L*u*v* color space. In this embodiment, color difference is described with the L*a*b* color space because a printer is used as the image output apparatus. The color difference $\Delta E^*_{ab}$ of the L*a*b* color space is defined by the following expression.

$$\Delta E^*_{ab} = \sqrt{(\Delta L^*)^2 + (\Delta a^*)^2 + (\Delta b^*)^2} \qquad \text{[Expression 1]}$$

In this embodiment, ($\Delta L^*$, $\Delta a^*$, $\Delta b^*$) represents the color difference between two colors in the L*a*b* color space. An example of steps for obtaining the color difference between the reference printed material and the user printed material is described as follows.

(1) Reference image data is obtained by reading the reference printed material with the scanner 300.
(2) User image data is obtained by reading the user printed material with the scanner 300 (same scanner 300 used in step (1)).
(3) The reference image data and the user image data are transformed to a device-independent color space (e.g., XYZ color space) by using a color profile of the scanner 300.
(4) The reference image data and the user image data being transformed into device-independent color space are further transformed to the L*a*b* color space.
(5) The color difference of each pixel is obtained by the expression 1.

In this embodiment, the reference printed material and the user printed material are read by the same scanner 300. Alternatively, the reference printed material and the user printed material may be read by separate scanners 300 under a condition where the color profile of the scanner 300 can be transformed to the device-independent color space by using the color profile of the scanner 300.

In a case where only a single scanner 300 is used, the reference printed material and the user printed material do not necessarily need to be transformed to a device-independent color space by using the color profile of the scanner 300. Although transformation to the device-independent color space may be necessary in a case of quantitatively evaluating the value of color difference because the absolute value is essential, the transformation to the device-independent color space may be omitted in a case of qualitatively evaluating the value of color difference because the transformation is not necessary as long as the relative tendency can be obtained.

After the color difference of each of the pixels is obtained, the quality of the user printed material can be evaluated by statistically analyzing the data pertaining to the color difference of the color pixels. As for the methods of analyzing the color difference of the pixels, there is, for example, a method of analyzing an average value of the color difference of the pixels, analyzing the maximum value of the color difference of the pixels, analyzing the distribution of the color difference of the pixels, and analyzing the variance of the color difference of the pixels.

In a case of determining whether the quality of the user printed material is appropriate, the criterion for such determination may be, for example, whether the average color difference is within a predetermined range, whether the maximum color difference is within a predetermined range, or whether the variance is within a predetermined range. In the case of evaluating the quality of the user printed material, it is preferable to omit the image data pertaining to a contour portion of the contents of the image data. This is due to, for example, the difficulty of perfectly matching the contour portion during a position matching process required to be performed afterwards or the difference of reproduction characteristic of the contour portion (tint, sharpness) among printers.

Because the area of the contour portion of the printed material is an extremely small relative to the entire area of the printed material, the area of the contour portion has little effect to the evaluation of the entire color tone (performed by visual observation). In quantitative evaluation, the color difference of the contour portion is liable to become an outlier and cause loss of reliability of the evaluation result. Therefore, an evaluation result having a higher precision is anticipated by ignoring the data of the contour portion.

As a method of detecting the contour portion, there is a method, for example, a method using binarization or a method using edge detection. As one example of the method using binarization, image data is binarized to black and white by using a predetermined threshold, and an area where black and white areas are adjacent to each other is determined as the contour portion. As one example of the method using edge detection, an edge image is formed from image data by using, for example, a Sobel method, the generated edge image is binarized with a predetermined threshold, and a pixel having a value greater than or equal to a predetermined threshold is determined as the contour portion.

There is also a method where the above-described problems can be reduced even were the contour portion is not removed. In this method, a smoothing process is performed on image data for smoothening the contour portion, so that the occurrence of the color difference can be reduced.

An average filter or a low pass filter may be used to perform the smoothing process.

b) Evaluation Method Using Hue Difference

The hue difference $\Delta H^*_{ab}$ of the L*a*b* color space is defined by the following expression.

$$\Delta H^*_{ab} = \sqrt{(\Delta E^*_{ab})^2 - (\Delta L^*)^2 - (\Delta C^*_{ab})^2} \quad \text{[Expression 2]}$$

In this embodiment, $\Delta E^*_{ab}$ represents color difference, ($\Delta L^*$, $\Delta a^*$, $\Delta b^*$) represents the chromaticity difference between 2 colors, and $\Delta C^*_{ab}$ represents difference of chroma. The chroma "$\Delta C^*_{ab}$" is defined by the following expression.

$$C^*_{ab} = \sqrt{(a^*)^2 + (b^*)^2} \quad \text{[Expression 3]}$$

Although the steps for obtaining hue difference between the reference printed material and the user printed material are the same as the steps for obtaining the color difference, hue instead of color difference is calculated. Further, the method for statistically analyzing hue difference and the method for evaluating quality of hue difference are also the same those of the color difference.

c) Evaluation Method Using Absolute Value of Difference Each Color Component

With this method, the absolute value of the difference of each color component in a predetermined color space of the reference printed material and the user printed material is obtained, and the obtained absolute value is evaluated. For example, in a case where the color space is an RGB color space, the absolute value of the difference of R component values, the absolute value of the difference of G component values, and the absolute value of the difference of B component values are used.

The steps for obtaining the absolute value of the difference of each color component between the reference printed material and the user printed material are described as follows.

1) Reference image data is obtained by reading the reference printed material with the scanner 300.

(2) User image data is obtained by reading the user printed material with the scanner 300 (same scanner 300 used in step (1)).

(3) The reference image data and the user image data are transformed to a device-independent color space (e.g., XYZ color space) by using a color profile of the scanner 300.

(4) The absolute value of the difference of each color component for each pixel is obtained after the transforming of the color space.

Similar to the case of obtaining the color difference, the reference printed material and the user printed material do not necessarily need to be transformed to a device-independent color space by using the color profile of the scanner 300. The absolute value of the difference of each of the color components may be directly obtained from a device-dependent color space of the scanner 300. Further, the statistical analyzing method and the quality determining method are also the same those of the case of obtaining color difference.

Then, the step of estimating the color reproduction characteristic of the user printer 200 (Step S150) has been described above with reference to FIG. 9.

Then, the color tone transformation parameter determining unit 46 obtains the color tone transformation parameter (Step S160). That is, the color tone transformation parameter is obtained by combining the color tone reproduction characteristic of the reference printer 400 and the color tone reproduction characteristic of the user printer 200. An example of the steps for obtaining the color tone transformation parameter is described as follows.

(1) Select a given value of a given color component of original image data;
(2) Obtain value s of reference image data corresponding to value a of selected color component from the color tone reproduction characteristic data of the reference printer 400;
(3) Obtain value b of original image data corresponding to obtained value s of reference image data from the color tone reproduction characteristic data of the user printer 200;
(4) Associate the color component values a and b to each other, and record the associated color components; and
(5) Repeat steps (1) to (4) with respect to each value of each color component of the original image data.

Accordingly, the color tone transformation parameter can be obtained by directly using the associated values or by processing the associated values and using the processed values.

a) Case of Directly Using the Associated Values

A pair(s) of the associated values is used as a LUT (Lookup Table), and the LUT is used as a color tone transformation parameter.

b) Case of Processing the Associated Values and Using the Processed Values

The associated values are processed by the above-described methods performed in estimating the transformation characteristic (e.g., method of using the moving average, method of linear or curved approximation, method of reducing gradation). After the associated values are processed, the processed associated values are used. The associated values are used as a LUT. Thus, similar to step a), the LUT is used as a color tone transformation parameter. In a case where the linear or curved approximation method is used, the coefficient of the function expression of the linear or curved approximation may be used as the color tone transformation parameter. In a case of using gamma correction (similar to curved approximation), gamma values are obtained by using the associated values, and the obtained gamma values may be used as color tone transformation parameter.

The color tone transformation parameter determining unit 46 evaluates the color tone transformation parameter and determines whether the color tone transformation parameter is appropriate (Steps S170, S180).

In a case where the color tone transformation parameter is evaluated as inappropriate (No in Step S180), the operation is terminated. In a case where the color tone transformation parameter is evaluated as appropriate (Yes in Step S180), the operation proceeds to the next step.

As a method for determining whether the color tone transformation parameter of Step S140 is appropriate, there is, for example, a method of determining the deviated amount from a parameter in which input and output match each other during color tone transformation.

Supposing that color tone transformation is illustrated as a graph, the deviated amount may be determined using the following measurements:
a) Accumulated value of absolute value of the difference of input and output;
b) Accumulated value of a square value of the difference of input and output;
c) Maximum value of absolute value of the difference of input and output; or
d) Maximum value of absolute value of inclination of the graph.

Supposing an evaluated value is within a predetermined range as a result of the determination using the measurements, the color tone transformation parameter can be determined to be appropriate.

Figure 14A:
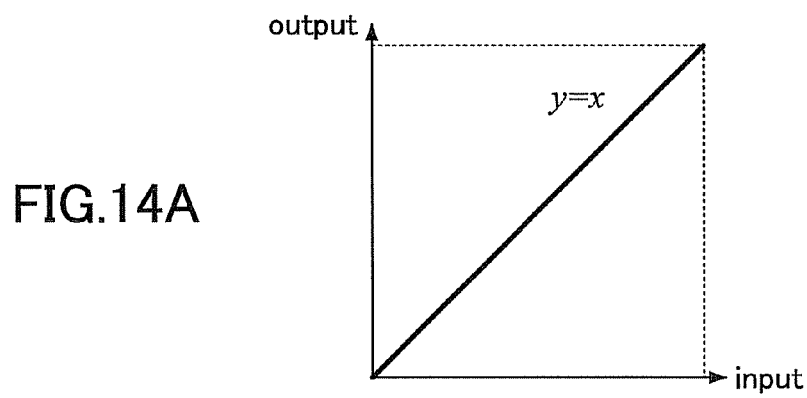
FIGS. 14A-14D are schematic diagrams illustrating examples of a color tone transformation parameter in a case where image data does not change before and after color tone transformation.
Figure 14B:
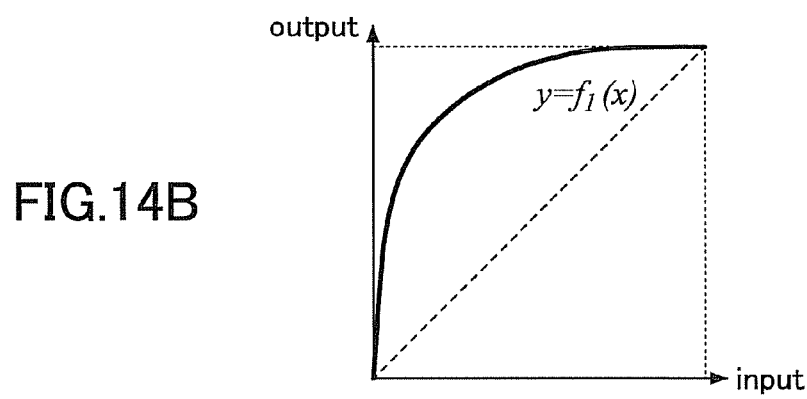
Figure 14C:
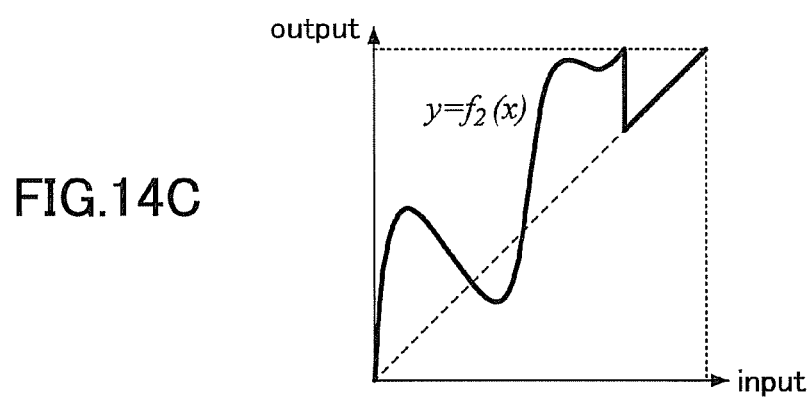

The determining of whether the color tone transformation parameter is appropriate is for determining whether it is significant to conduct color tone transformation by using the color tone transformation parameter. Thus, the determining of whether the color tone transformation parameter is appropriate may be referred to as determining of convergence of color tone transformation. Accordingly, Step S180 may be omitted according to necessity. Examples where color tone transformation has little significance are described as follows.

a) Case where there is No Change of Image Data Before and after Color Tone Transformation FIG. 14A is a schematic diagram illustrating an example of a color tone transformation parameter in a case where image data does not change before and after color transformation. In FIG. 14A, in a case where a color tone transformation parameter is illustrated in a graph, the color tone transformation parameter substantially matches the line indicating that input and output are equivalent (y=x). If the color tone transformation is gamma correction, the gamma value would substantially match 1.0. In this case, there is substantially no significance in conducting color tone transformation.

b) Case where there is an Extreme Change of Image Data Before and after Color Tone Transformation FIGS. 14B and 14C are schematic diagrams illustrating examples of a color tone transformation parameter in a case where there is an extreme change of image data before and after color tone transformation, respectively. In FIG. 14B, in a case where a color tone transformation parameter is illustrated in a graph, the color tone transformation parameter significantly deviates from the line indicating that input and output are equivalent (y=x). In this case of FIG. 14B, it is preferable not to perform color tone transformation because the color tone of the user printed material is significantly changed by color tone transformation. In FIG. 14C, the color tone transformation parameter is extremely undulate and discontinuous compared to the line indicating that input and output are equivalent (y=x). In this case of FIG. 14C, it is preferable to not perform color tone transformation because the color tone of the user printed material is discontinuously changed by color tone transformation. If the color tone transformation is gamma correction, the gamma value would either be substantially close to 0 or significantly greater than 1 in the case of FIG. 14B.

As illustrated in FIG. 14C, in general, it is not preferable to perform color tone transformation when multiple input values correspond to a single output value or when the points of color tone transformation are discontinuous. Nevertheless, depending on the conditions (e.g., degree in which the points are discontinuous), color tone transformation may be performed even in a case similar to FIG. 14C.

Figure 14D:
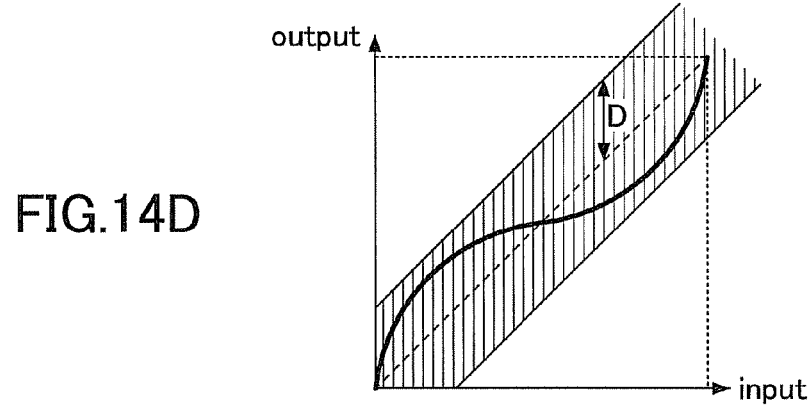

As illustrated in FIG. 14D, it can be determined that image data does not significantly change before and after color tone transformation in depending on whether the color tone transformation parameter is within a predetermined range with respect to the line indicating that input and output are equivalent (y=x). That is, it can be determined whether an output value of the color tone transformation parameter is ±d % or within a pixel value range D with respect to each input value of the color tone transformation parameter.

In a case where the color tone transformation parameter is appropriate (Yes in Step S180), the color tone transformation unit 47 performs color tone transformation on the original image data (Step S190). By performing color tone transformation with the color tone transformation parameter, the original image data is updated.

Thereby, a single round of a color tone transformation operation is finished. As a method of color tone transformation, there is, for example, a transformation method using gamma correction and a transformation method using a LUT (Look-Up Table).

The color tone transformation operation is repeated for a predetermined number of times. Accordingly, in a case where the number of times of performing the color tone transformation operation has reached the predetermined number of times (Yes in Step S200), the color tone transformation operation of FIG. 19 is terminated. Although satisfactory color tone transformation can be performed even where the color tone transformation operation is performed only once, the precision of color matching can be improved by repeating the number of times of performing the color tone transformation operation.

In a case of continuing the color tone transformation operation (No in Step S200), the same steps are performed where a color matched original image data is input to the user printer 200 and output from the user printer 200 (Step S120). All of the original image data used in the subsequent loop may be original image data that have been subjected to the color tone transformation.

It is to be noted that, processes such as estimating the color tone characteristic of the user printer 200 or transforming the color tone may be performed on original image data or original image data which has already been subjected to the color tone transformation process. For example, the color tone transformation process may be performed in 2 types of patterns. The first type is performing the color tone transformation process two times in which color tone transformation is performed on original image data for the first time, and color tone transformation is performed for the second time on the original image data being subjected to the color tone transformation process. The second type is performing the color tone transformation process two times in which color tone transformation is performed on original image data for the first time, then, color tone transformation is performed on original image data for the second time, and then compositing (combining) the results of the first and second color tone transformation processes. The first and the second types of color tone transformation processes may be performed according to circumstance. It is preferable to use the first type in a case where a simple sequential operation is desired. It is preferable to use the second type in a case of avoiding accumulation of error due to performing the color tone transformation process on the original image data for multiple times.

Although there are 3 conditions for terminating the color tone transformation in FIG. 13, all 3 conditions do not necessarily need to be set. That is, one or more of the conditions may be omitted according to circumstance. It is, however, preferable to set at least one of the 3 conditions in FIG. 13.

In this embodiment, although the color space used is the same as the color space used in reading image data with the scanner 300, it is preferable to change color space to a device-independent color space by using a color profile of the scanner 300 because the color space used is a device-dependent color space. As an example of a device-independent color space, there is, for example, a device-independent RGB color space or a device-independent XYZ color space.

In a case of processing output image data after performing color tone transformation in a L*a*b* color space, it is also necessary to perform color tone transformation on original image data in the L*a*b* color space. Further, the estimating of color reproduction characteristic, the determining of color tone transformation parameter, and the performing of color tone transformation in the L*a*b* color space. However, it is necessary to return the color space to its initial color space after color tone transformation has been performed.

[Other Examples of Color Tone Transformation]
(1) Transforming TRC (Tone Reproduction Curve)
A TRC is transformed based on halftone dot density corresponding to an original image.
Color a→halftone density A
Color b→halftone density B
If the color a becomes the color b according to the color tone transformation parameter, the halftone density A is transformed to the halftone density B.
(2) Replacing in Units of Pixels (Use Matrix or List as LUT).
Replace color of nearest pixel which is to become the same output color with original color
(3) Applying Difference to Transformation Matrix and Using the Matrix on the Original Image Data
Achieve color tone transforming by obtaining difference between reference image data and user image data, applying the obtained difference to a color tone transformation parameter, and using the color tone transformation parameter on the original image data. In this case, the amount of deviation from a straight line indicating that two gradations are equivalent (y=x) is used as the color tone transformation parameter where the horizontal axis represents the gradation of the reference image data and the vertical axis represents the gradation of the user image data. In the case of applying the difference to the color tone transformation parameter, the difference may be applied so that the weight of the color tone transformation parameter increases as the amount of deviation increases.
(4) Using the ICC (International Color Consortium) Profile
In the ICC profile, the parameter or LUT for converting the device-dependent color space to a PCU (Profile Connection Space) is determined by using the color tone transformation parameter. In a case where an input profile is attached to the original image data, the original image data may be updated with the input profile. If no input profile is attached to the original image data, the original image data may be generated and have the input profile attached thereto. Alternatively, an output profile may be updated instead of the input profile.

Although a single color tone transformation parameter is estimated with respect to original image data in the above-described embodiment, more than one color tone transformation parameter may be estimated. For example, in a case where original image data is divided into blocks, color tone transformation may be performed by estimating color tone transformation parameters for each of the divided blocks of the original image data. In the case of performing color tone transformation for each block, color tone may be discontinuous at the borders of the blocks. Therefore, color transformation may be performed by calculating color tone transformation parameters with respect to each pixel of the original image data or with respect to each region (smaller than a block) of the original image data, so that the discontinuity can be prevented.

Second Embodiment

According to the following second embodiment of the present invention, the first image output apparatus is a display, the second image output apparatus is a projector, and the image reading unit is a digital camera. In this embodiment, it is possible to obtain a color profile by, for example, displaying a color chart in view that both the first and the second image output apparatuses conform to the management (control) of the user. However, by using the below-described method, color matching can be performed without having to use a color profile.

Figure 15:
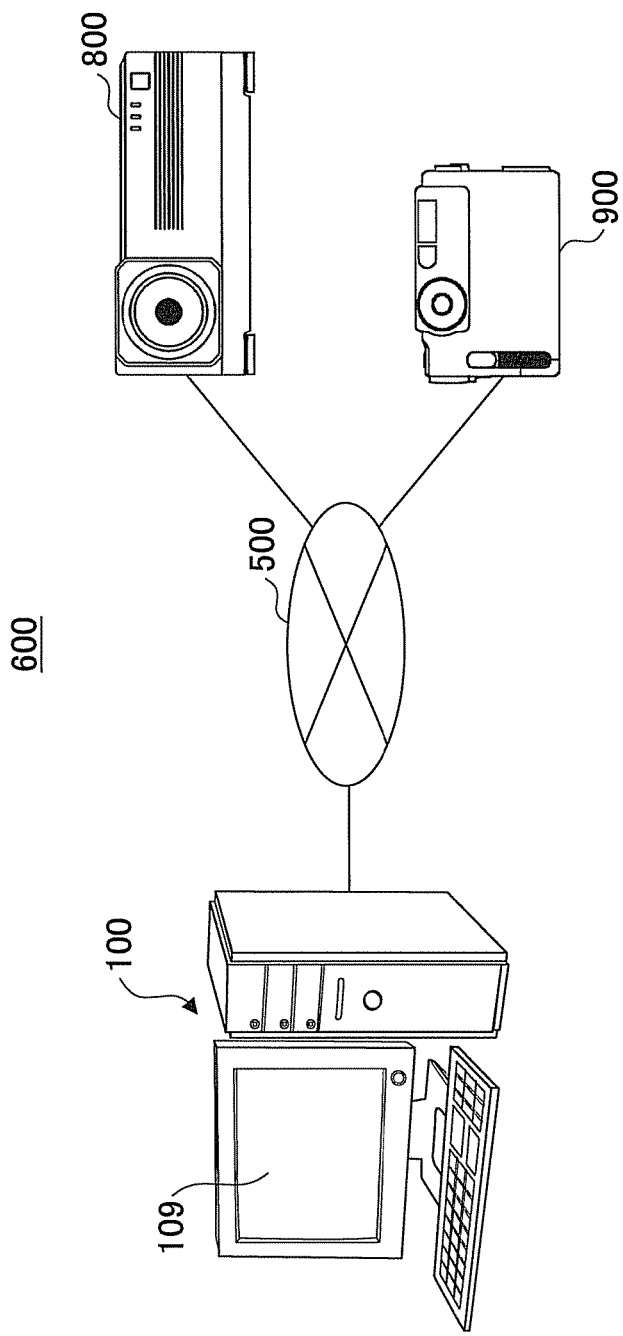
FIG. 15 is a schematic diagram illustrating an example of a color tone transformation parameter generation system according to the second embodiment of the present invention.

FIG. 15 is a schematic diagram illustrating an example of a color tone transformation parameter generation system 600 according to the second embodiment of the present invention. The color tone transformation parameter generation system 600 includes the computer 100, a projector 800, and a digital camera 900 that are connected to the network 500.

In comparison with the color tone transformation parameter generation system 600 of FIG. 3, the color tone transformation parameter generation system 600 of FIG. 15 has:
a) the display 109 corresponding to the reference printer 400;
b) a reference display screen of the display 109 corresponding to the reference printed material;
c) the projector 800 corresponding to the user printer 200;
d) a user display screen projected by the projector 800 corresponding to the user printed material; and
e) the digital camera 900 corresponding to the scanner 300.

In the first embodiment, the L*a*b* color space is used as the uniform color space because printers are used as the image output apparatuses. In the second embodiment, the L*u*v* color space is used as the uniform color space because the display 109 and the projector 800 are used as the image output apparatuses. Because the functional block diagram of the second embodiment is the same as that of the first embodiment, the functional block diagram of the second embodiment is omitted.

Figure 16:
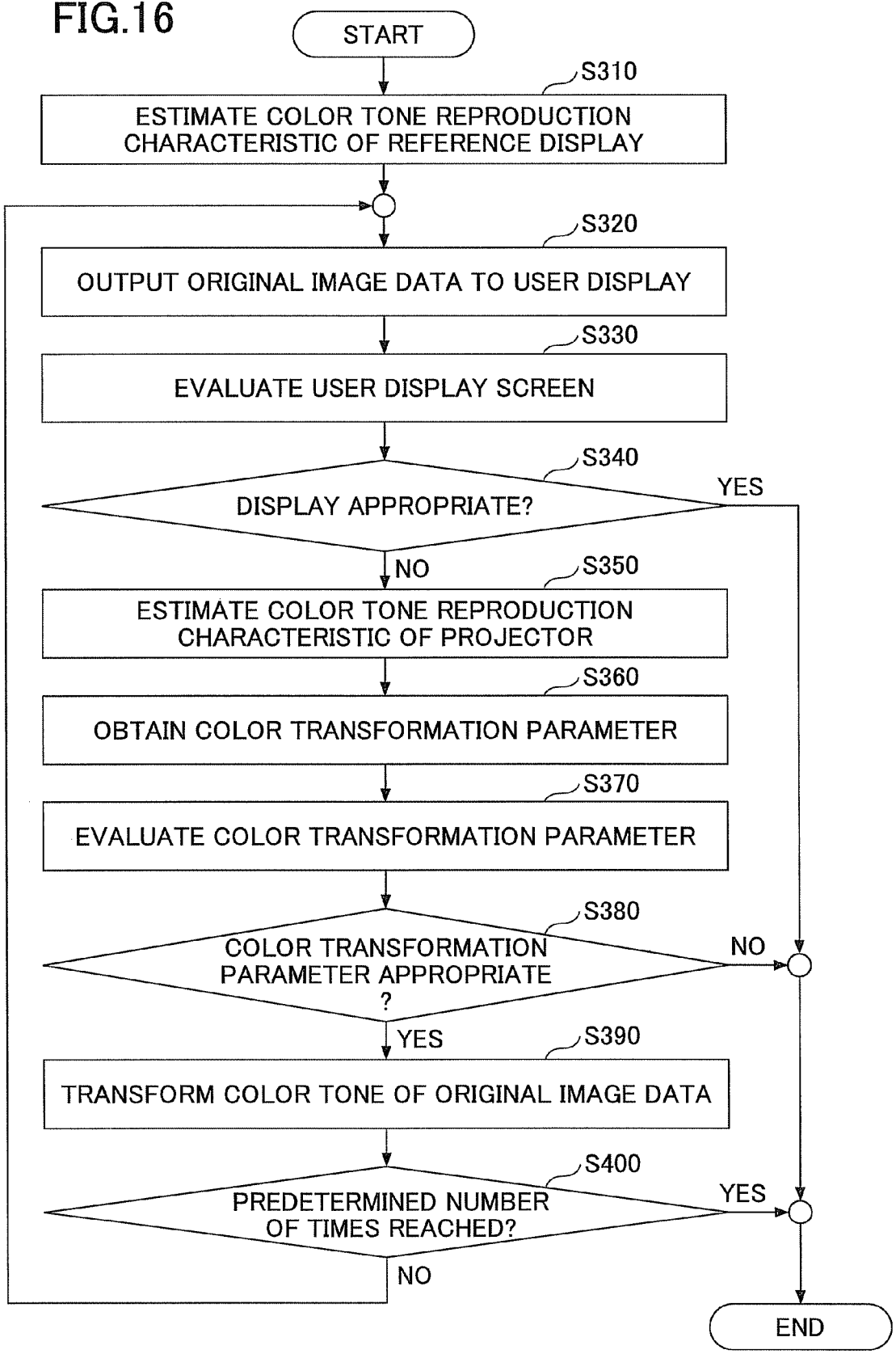
FIG. 16 is a flowchart illustrating an example of an operation of generating a color tone transformation parameter by a color transformation parameter generation system or a MFP according to the second embodiment of the present invention.

FIG. 16 is a flowchart illustrating an example of an operation of generating a color tone transformation parameter by the color transformation parameter generation system 600 or the MFP 700 according to the second embodiment of the present invention. The steps in the operation illustrated in FIG. 16 are substantially the same as those illustrated in FIG. 13 except that the apparatuses are different. In FIG. 16, steps that are the same as those of FIG. 13 are not further explained.

The color tone reproduction characteristic of the display 109 is estimated by, for example, the color tone reproduction characteristic estimating unit 45 (Step S310). That is, the color tone reproduction characteristic of the display 109 is estimated based on the reference display screen output by the display 109 and the original image data.

Then, the user projects the original image data with the projector 800 (Step S320). The user display screen is obtained by projecting the original image data by using the projector 800.

Then, the color tone transformation parameter determining unit 46 evaluates the user display screen (Step S330). That is, the color tone transformation parameter determining unit 46 compares the user display screen and the reference display screen and evaluates the quality of the user display screen based on the comparison (Step S340). In a case where the quality of the user display screen is appropriate (Yes in Step S340), the operation is terminated. In a case where the quality of the user display screen is inappropriate (No in Step S340), the operation proceeds to Step S350.

As for the method of evaluating the quality of the user display screen, there is a method of, for example, using the color difference with respect to the reference display screen. As for other methods, there is, for example, a method of using the hue difference or a method of using the difference of the absolute value of each color component. The evaluation of quality of the user display screen may be performed by visual observation. The methods for evaluating the quality of the user display screen are substantially the same as those of the first embodiment.

a) Evaluation Method Using Color Difference

Color difference is the distance between two colors in a L*a*b* color space or a L*u*v* color space. In this embodiment, color difference is described with the L*u*v* color space because the display 109 and the projector 800 are used as the image output apparatuses. The color difference $\Delta E^*_{uv}$ of the L*u*v* color space is defined by the following expression.

$$\Delta E^*_{uv} = \sqrt{(\Delta L^*)^2 + (\Delta u^*)^2 + (\Delta v^*)^2} \quad \text{[Expression 4]}$$

In this embodiment, $(\Delta L^*, \Delta u^*, \Delta v^*)$ represents the color difference between two colors in the L*u*v* color space. An example of steps for obtaining the color difference between the reference display screen and the user display screen is described as follows.

(1) Reference image data is obtained by reading the reference display screen with the digital camera 900.
(2) User image data is obtained by reading the user display screen with the digital camera 900 (same digital camera 900 used in step (1)).
(3) The reference image data and the user image data are transformed to a device-independent color space (e.g., XYZ color space) by using a color profile of the digital camera 900.
(4) The reference image data and the user image data being transformed into device-independent color space are further transformed to the L*u*v* color space.
(5) The color difference of each pixel is obtained by the expression 4.

In this embodiment, the reference display screen and the user display screen are read by the same digital camera 900. Alternatively, the reference display screen and the user display screen may be read by separate digital cameras 900 under a condition where the color profile of the digital camera 900 can be transformed to the device-independent color space by using the color profile of the digital camera 900.

In a case where only a single digital camera 900 is used, the reference display screen and the user display screen do not necessarily need to be transformed to a device-independent color space by using the color profile of the digital camera 900. Although transformation to the device-independent color space may be necessary in a case of quantitatively evaluating the value of color difference because the absolute value is essential, the transformation to the device-independent color space may be omitted in a case of qualitatively evaluating the value of color difference because the transformation is not necessary as long as the relative tendency can be obtained.

After the color difference of each of the pixels is obtained, the quality of the user printed material can be evaluated by statistically analyzing the data pertaining to the color difference of the color pixels. As for the methods of analyzing the color difference of the pixels, there is, for example, a method of analyzing an average value of the color difference of the pixels, analyzing the maximum value of the color difference of the pixels, analyzing the distribution of the color difference of the pixels, and analyzing the variance of the color difference of the pixels.

In a case of determining whether the quality of the user printed material is appropriate, the criterion for such determination may be, for example, whether the average color difference is within a predetermined range, whether the maximum color difference is within a predetermined range, or whether the variance is within a predetermined range. In the case of evaluating the quality of the user display screen, it is preferable to omit the image data pertaining to a contour portion of the contents of the image data. This is due to, for example, the difficulty of perfectly matching the contour portion during a position matching process required to be performed afterwards or the difference of reproduction characteristic of the contour portion (tint, sharpness) among displays.

Because the area of the contour portion of the display screen is an extremely small relative to the entire area of the display screen, the area of the contour portion has little effect to the evaluation of the entire color tone (performed by visual observation). In quantitative evaluation, the color difference of the contour portion is liable to become an outlier and cause loss of reliability of the evaluation result. Therefore, an evaluation result having a higher precision is anticipated by ignoring the data of the contour portion.

b) Evaluation Method Using Hue Difference

The hue difference $\Delta H^*_{uv}$ of the L*u*v* color space is defined by the following expression.

$$\Delta H^*_{uv} = \sqrt{(\Delta E^*_{uv})^2 - (\Delta L^*) - (\Delta C^*_{uv})^2} \quad \text{[Expression 5]}$$

In this embodiment, $\Delta E^*_{uv}$ represents color difference, ($\Delta L^*$, $\Delta u^*$, $\Delta v^*$) represents the chromaticity difference between 2 colors, and $\Delta C^*_{uv}$ represents difference of chroma. The chroma "$\Delta C^*_{uv}$" is defined by the following expression.

$$C^*_{uv} = \sqrt{(u^*)^2 + (v^*)^2} \quad \text{[Expression 6]}$$

Although the steps for obtaining hue difference between the reference display screen and the user display screen are the same as the steps for obtaining the color difference, hue instead of color difference is calculated. Further, the method for statistically analyzing hue difference and the method for evaluating quality of hue difference are also the same those of the color difference.

c) Evaluation Method Using Absolute Value of Difference Each Color Component

With this method, the absolute value of the difference of each color component in a predetermined color space of the reference display screen and the user display screen is obtained, and the obtained absolute value is evaluated. For example, in a case where the color space is an RGB color space, the absolute value of the difference of R component values, the absolute value of the difference of G component values, and the absolute value of the difference of B component values are used.

The steps for obtaining the absolute value of the difference of each color component between the reference display screen and the user display screen are described as follows.

1) Reference image data is obtained by reading the reference display screen with the digital camera 900.

(2) User image data is obtained by reading, the user display screen with the digital camera 900 (same digital camera 900 used in step (1)).

(3) The reference image data and the user image data are transformed to a device-independent color space by using a color profile of the digital camera 900.

(4) The absolute value of the difference of each color component for each pixel is obtained after the transforming of the color space.

Similar to the case of obtaining the color difference, the reference display screen and the user display screen do not necessarily need to be transformed to a device-independent color space by using the color profile of the digital camera 900. The absolute value of the difference of each of the color components may be directly obtained from a device-dependent color space of the digital camera 900. Further, the statistical analyzing method and the quality determining method are also the same those of the case of obtaining color difference.

The geometric transformation parameter estimating unit 42 estimates the color tone reproduction characteristic of the projector 800 (Step S350). In this step, the color tone reproduction characteristic of the projector 800 is estimated based on the user image data output and displayed on the user display screen by the projector 800 and the original image data.

Then, the color tone transformation parameter determining unit 46 obtains the color tone transformation parameter (Step S360). That is, the color tone transformation parameter is obtained by combining the color tone reproduction characteristic of the reference display 109 and the color tone reproduction characteristic of the projector 800. An example of the steps for obtaining the color tone transformation parameter is described as follows.

(1) Select a given value of a given color component of original image data;
(2) Obtain value s of reference image data corresponding to value a of selected color component from the color tone reproduction characteristic data of the display 109;
(3) Obtain value b of original image data corresponding to obtained value s of reference image data from the color tone reproduction characteristic data of the projector 800;
(4) Associate the color component values a and b to each other, and record the associated color components; and
(5) Repeat steps (1) to (4) with respect to each value of each color component of the original image data.

Accordingly, the color tone transformation parameter can be obtained by directly using the associated values or by processing the associated values and using the processed values.

a) Case of Directly Using the Associated Values

A pair(s) of the associated values is used as a LUT (Look-up Table), and the LUT is used as a color tone transformation parameter.

b) Case of Processing the Associated Values and Using the Processed Values

The associated values are processed by the above-described methods performed in estimating the transformation characteristic (e.g., method of using the moving average, method of linear or curved approximation, method of reducing gradation). After the associated values are processed, the processed associated values are used. The associated values are used as a LUT. Thus, similar to step a), the LUT is used as a color tone transformation parameter. In a case where the linear or curved approximation method is used, the coefficient of the function expression of the linear or curved approximation may be used as the color tone transformation parameter. In a case of using gamma correction (similar to curved approximation), are gamma values are obtained by using the associated values, and the obtained gamma values may be used as color tone transformation parameter.

The color tone transformation parameter determining unit 46 evaluates the color tone transformation parameter and determines whether the color tone transformation parameter is appropriate (Step S370). In a case where the color tone transformation parameter is evaluated as appropriate (Yes in Step S380), the operation proceeds to the next step. In a case where the color tone transformation parameter is evaluated as inappropriate (No in Step S380), the operation is terminated.

The determining of whether the color tone transformation parameter is appropriate is for determining whether it is significant to conduct color tone transformation by using the color tone transformation parameter. Thus, the determining of whether the color tone transformation parameter is appropriate may be referred to as determining of convergence of color tone transformation. Accordingly, Step S370 may be omitted according to necessity. Examples where color tone transformation has little significance are substantially the same as those of the first embodiment.

In a case where the color tone transformation parameter is appropriate (Yes in Step S380), the color tone transformation unit 47 performs color tone transformation on the original image data (Step S390). By performing color tone transformation with the color tone transformation parameter, the original image data is updated. Thereby, a single cycle of a color tone transformation operation is finished.

In this embodiment, although the color space used is the same as the color space used in reading image data with the digital camera 900, it is preferable to change color space to a device-independent color space by using a color profile of the digital camera 900 because the color space used is a device-dependent color space. As an example of a device-independent color space, there is, for example, a device-independent RGB color space or a device-independent XYZ color space. It is more preferable to transform to the color space to a uniform color space such as the L*u*v* color space.

In a case of processing output image data after performing color tone transformation in a L*u*v* color space, it is also necessary to perform color tone transformation on original image data in the L*u*v* color space. Further, the estimating of color reproduction characteristic, the determining of color tone transformation parameter, and the performing of color tone transformation in the L*u*v* color space. However, it is necessary to return the color space to its initial color space after color tone transformation has been performed.

Third Embodiment

In the third embodiment, instead of performing a color tone transformation process on original image data as in the first embodiment, the color tone transformation parameter generation system 600 changes the method of color separation (converting original image data to CMY or CMYK) with a color tone transformation parameter in a case of outputting the original image data. By changing the color separation method with the color tone transformation parameter, the output results of the first and the second image output apparatuses can be matched.

Because the schematic diagram illustrating the configuration of the color tone transformation parameter generation system 600 and the functional block diagram of the third embodiment are substantially the same as those of the first embodiment, the schematic diagram illustrating the configuration of the color tone transformation parameter generation system 600 and the functional block diagram of the third embodiment are omitted.

Figure 17:
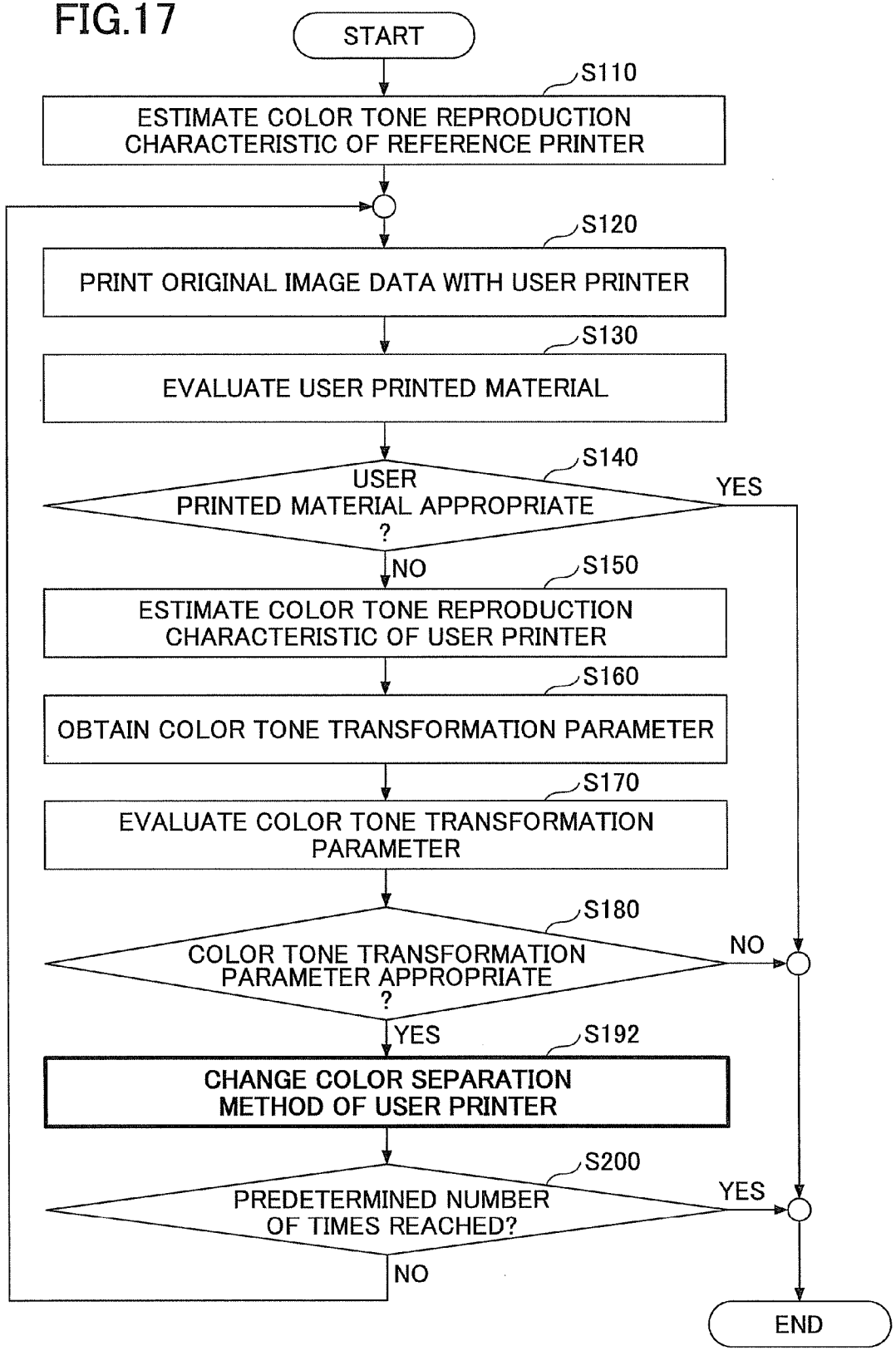
FIG. 17 is a flowchart illustrating an example of an operation of generating a color tone transformation parameter by a color transformation parameter generation system or a MFP according to the third embodiment of the present invention.

FIG. 17 is a flowchart illustrating an example of an operation of generating a color tone transformation parameter by the color transformation parameter generation system 600 or the MFP 700 according to the third embodiment of the present invention. The steps in the operation illustrated in FIG. 17 are substantially the same as those illustrated in FIG. 13 except that the step of performing color tone transformation on original image data (Step S190) is replaced with a step of converting the color separation method of the user printer (Step S192). In FIG. 17, steps that are the same as those of FIG. 13 are not further explained. Thus, Step S192 is mainly described as follows.

In Step S192, the color tone transformation unit 47 changes the color separation method of the user printer 200 (Step S192). More specifically, the color tone transformation unit 47 changes the color separation method of the user printer 200 by using a color tone transformation parameter.

In changing the color separation method, there is a first method in which a parameter(s) is changed without having to change the color separation method, and a second method in which the color separation method itself is changed. As one example of the first method, there is a method of changing the content of a LUT according to the color tone transformation parameter in a case where color separation is performed by using the LUT. This example of the first method is performed as follows:
(1) Obtain a corresponding relationship of colors of the original image data (a, b) based on the color tone transformation parameter obtained in Step S160;
(2) Obtain CMY/CMYK density B corresponding to color b according to the LUT;
(3) Replace CMY/CMYK density A corresponding to color a according to the LUT with the CMY/CMYK density B; and
(4) Repeat steps (1) to (3) with respect to each color.

In a case where separate LUTS are used in correspondence with each of the color components, color separation is performed with the above-described steps (1)-(4). In a case where the LUT is defined three-dimensionally, it is necessary to obtain the color tone transformation parameter in correspondence with the three-dimensionally defined LUT. That is, although the color tone transformation parameter is obtained in correspondence with each color component in the first embodiment, the third embodiment requires the corresponding relationship of colors to be obtained in correspondence with a combination of 3 color components and obtain the color tone transformation parameter in the case where the LUT is defined three-dimensionally. In a case where there is a missing element in the color tone transformation parameter or the LUT, a known interpolation method such as linear interpolation or cubic interpolation is to be used according to necessity.

As an example of the second method, there is a method in which an optimum color separation method (i.e. a color separation method that is most suitable for the obtained color tone transformation parameter) is selected from multiple color separation methods registered beforehand. This method is performed as follows:
(1) Prepare multiple color separation methods;
(2) Associate a particular color tone transformation parameter to each of the color separation methods and register the color separation methods in association with the particular color tone transformation parameter; and
(3) Select a color separation method associated to the color transformation parameter which is most similar to the color tone transformation parameter obtained in Step S160.

In the second method, multiple color tone transformation parameters that are similar to the obtained color tone transformation parameter may be obtained, and the color separation results using the similar color tone transformation parameters may be combined by using the degree of similarity of the color tone transformation parameters as a weight.

Fourth Embodiment

In the fourth embodiment, instead of obtaining the color tone transformation parameter in correspondence with each color component, the color tone transformation parameter generation system 600 generates the color tone transformation parameter in correspondence with each pixel of the original image data (i.e. generates the color tone transformation parameter in units of pixels) and performs color tone transformation separately in units of pixels. In a case where color tone transformation is performed on original image data including plural pixels initially having the same color according to the first embodiment, all of the plural pixels of the same color are transformed into the same color. In the fourth embodiment, even where the original image data includes plural pixels initially having the same color, color tone transformation can be performed with respect to each of the plural pixels instead of transforming the plural pixels into the same color.

Because the schematic diagram illustrating the configuration of the color tone transformation parameter generation system 600 and the functional block diagram of the fourth embodiment are substantially the same as those of the first embodiment, the schematic diagram illustrating the configuration of the color tone transformation parameter generation system 600 and the functional block diagram of the fourth embodiment are omitted.

FIG. 18 is a flowchart illustrating an example of an operation of reading a reference printed material and a user printed material with the image reading unit 41 and generating color tone reproduction characteristic data with, for example, the color tone reproduction characteristic estimating unit 45. FIG. 19 is a flowchart illustrating an example of an operation of generating a color tone transformation parameter by the color tone transformation parameter generation system 600 or the MFP 700 according to the fourth embodiment of the present invention.

In FIG. 18, Step S104 of FIG. 9 is replace with Step S1041. In Step S1041, the color component value associating unit 44 associates the colors of the original image data and the colors of the reference image data (or the user image data). That is, in Step S1041, color association data is generated by associating a color of a corresponding pixel of the reference image data (or user image data) to a color of each pixel of the original image data by using pixel association data. Step S1041 may be performed together with Step S103.

The color tone reproduction characteristic estimating unit 45 uses the color association data as color tone reproduction characteristic data (Step S1051).

The steps in the operation illustrated in FIG. 19 are substantially the same as those illustrated in FIG. 15 except that the step of obtaining the color tone transformation parameter (Step S160) and the step of performing color tone transformation on original image data (Step S190) are different.

In Step S160, the color tone transformation parameter determining unit 46 obtains the color tone transformation parameter (Step S160). That is, in this step, the color tone transformation parameter is obtained by combining the color tone reproduction characteristic data of the reference printer 400 and the color tone reproduction characteristic data of the user printer 200. The color tone transformation parameter is obtained as follows:
(1) Select a given pixel of original image data;
(2) Obtain a color s of output image data corresponding to color a of the selected pixel from the color tone reproduction characteristic data of the reference printer 400;
(3) Obtain a color b of original image data corresponding to obtained color s of user image data from the color tone reproduction characteristic data of the user printer 200;
(4) Associate the colors a and b to each other, and record the associated colors; and
(5) Repeat steps (1) to (4) with respect to each pixel of the original image data.

The above-described associated data are used as data of the LUT. One or more pixels corresponding to a color(s) of the reference image data may be included in the user image data. In a case of obtaining the color tone transformation parameter where there are plural corresponding pixels, one or more colors of a pixel nearest to the selected pixel may be used in which the distances from the selected pixel are combined as a weight. In a case of obtaining the color tone transformation parameter where there are no pixel in the user image data corresponding to the color of the reference image data, one or more colors b' of the user image data corresponding to color a' being similar to the color a of the reference image data may be obtained and used. Similar to the case where there are plural colors b corresponding to the color a, one or more colors of a pixel nearest to the selected pixel may be used in which the distances from the selected pixel are combined as a weight.

Then, the color tone transformation unit 47 performs color tone transformation on the original image data in units of pixels (Step S190). That is, in Step S190, color tone transformation is performed on the original image data by using the color tone transformation parameter in units of pixels, to thereby update the original image data. In the color tone transformation of the fourth embodiment, the pixel value of each pixel of the original image data is transformed with the above-described LUT.

Because the color tone transformation parameter is generated in units of pixels according to the fourth embodiment, even in a case where plural pixels having the same color are included, color tone transformation can be performed without transforming the plural pixels into the same color.

The present invention is not limited to the specifically disclosed embodiments, and variations and modifications may be made without departing from the scope of the present invention.

The present application is based on Japanese Priority Application No. 2011-165810 filed on Jul. 28, 2011, the entire contents of which are incorporated herein by reference.

What is claimed is:

1. An image processing apparatus comprising:
a transformation unit configured to reproduce a color tone of a first output data of an original image data output from a first image output apparatus by using a second output data of the original image data output from a second image output apparatus;
an estimating unit configured to estimate first and second geometric transformation parameters;
an associating unit configured to generate first and second color component value association data; and
a determining unit configured to generate a color tone transformation parameter based on a combination of pixel values in which a pixel value of the first image output data is substantially equivalent to a pixel value of the second image output data;
wherein the transformation unit is configured to transform pixel values of the original image data with the color tone transformation parameter generated by the determining unit;
wherein the associating unit is configured to detect at least a first pixel located in corresponding positions of the original image data and the first output data based on the first geometric transformation parameter and at least a second pixel located in corresponding positions of the original image data and the second output data based on the second geometric transformation parameter;
wherein the associating unit is configured to generate the first and second color component value association data based on the detected first and the second pixels.

2. The image processing apparatus as claimed in claim 1, wherein the determining unit is configured to
read out a first pixel value associated to a pixel value of an arbitrary pixel of the original image data based on the first color component value association data,
read out a second pixel value of the original image data associated to the first pixel value based on the second color component value association data, and record the pixel value of the arbitrary pixel in association with the second pixel value.

3. The image processing apparatus as claimed in claim 2, wherein the associating unit is configured to generate the first and the second color component value association data after the original image data, the first output data, and the second output data are transformed in a device-independent color space.

4. The image processing apparatus as claimed in claim 3, wherein the determining unit is configured to determine whether the color tone transformation parameter is appropriate when at least one of first and second conditions is satisfied, wherein the first condition is whether the color tone transformation parameter is within a predetermined range, wherein the second condition is whether a difference between a pixel value before being transformed by the color tone transformation parameter and a pixel value after being transformed by the color tone transformation parameter satisfies a predetermined criterion.

5. The image processing apparatus as claimed in claim 3, further comprising:
another estimating unit configured to determine first and second association parameters, the first association parameter associating the original image data of the first color component value association data with the first output data, and the second association parameter associating the original image data of the second color component value association data with the second output data;
wherein the other estimating unit is configured to determine the first association parameter that associates the first output data with the original image data after gradation of the original image data is reduced, and determine the second association parameter that associates the second output data with the original image data after gradation of the original image data is reduced.

6. The image processing apparatus as claimed in claim 5, wherein other estimating unit is configured to reduce gradation by assuming that a single gradation is equivalent to one section of the gradation of the original image data being unevenly divided so that the number of pixels become uniform.

7. The image processing apparatus as claimed in claim 4, wherein in a case where the determining unit determines that the color tone transformation parameter is appropriate, the associating unit is configured to generate a third color component value association data associating a third output data with a color component value of a corresponding pixel of the original image data, the third output data being output by the second image output apparatus by using the original image data having pixel values transformed by the transformation unit,
wherein the determining unit is configured to generate another color tone transformation parameter based on another combination of pixel values in which the pixel value of the first image output data is substantially equivalent to the pixel value of the third image output data.

8. The image processing apparatus as claimed in claim 2, wherein the transformation unit is configured to transforms pixel values of the original image data to pixel values of a different color space by using a lookup table;
wherein the determining unit is configured to read out the combination of pixel values from the color transformation parameter, read out a third pixel value of a different color space associated to a pixel value of an arbitrary pixel of the combination of pixel values according to the lookup table, and replace the third pixel value with a fourth pixel value of another different color space associated to the arbitrary pixel of the combination of pixel values according to the lookup table.

9. The image processing apparatus as claimed in claim 3, wherein the determining unit is configured to evaluate matching between the first and the second output data, wherein the determining unit is configured to refrain from generating the color tone transformation parameter when the determining unit determines that the first and the second output data match.

10. An image processing system comprising:
a first image output apparatus;
a second image output apparatus; and
an image processing apparatus including:
a transformation unit configured to reproduce a color tone of a first output data of an original image data output from the first image output apparatus by using a second output data of the original image data output from the second image output apparatus;
an estimating unit configured to estimate first and second geometric transformation parameters;
an associating unit configured to generate first and second color component value association data; and
a determining unit configured to generate a color tone transformation parameter based on a combination of pixel values in which a pixel value of the first image output data is substantially equivalent to a pixel value of the second image output data;
wherein the transformation unit is configured to transform pixel values of the original image data with the color tone transformation parameter generated by the determining unit;
wherein the associating unit is configured to detect at least a first pixel located in corresponding positions of the original image data and the first output data based on the first geometric transformation parameter and at least a second pixel located in corresponding positions of the original image data and the second output data based on the second geometric transformation parameter;
wherein the associating unit is configured to generate the first and second color component value association data based on the detected first and the second pixels.

11. An image processing method comprising the steps of:
a) reproducing a color tone of a first output data of an original image data output from a first image output apparatus by using a second output data of the original image data output from a second image output apparatus;
b) estimating first and second geometric transformation parameters;
c) generating first and second color component value association data; and
d) generating a color tone transformation parameter based on a combination of pixel values in which a pixel value of the first image output data is substantially equivalent to a pixel value of the second image output data;
wherein the step a) includes transforming pixel values of the original image data with the color tone transformation parameter generated in the step d);
wherein the step c) includes detecting at least a first pixel located in corresponding positions of the original image data and the first output data based on the first geometric transformation parameter and at least a second pixel located in corresponding positions of the original image data and the second output data based on the second geometric transformation parameter;

wherein the step c) includes generating the first and second color component value association data based on the detected first and the second pixels.

* * * * *